(12) United States Patent
Hotelling

(10) Patent No.: US 9,164,620 B2
(45) Date of Patent: Oct. 20, 2015

(54) TOUCH SENSING ERROR COMPENSATION

(75) Inventor: Steven Porter Hotelling, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 414 days.

(21) Appl. No.: 12/877,061

(22) Filed: Sep. 7, 2010

(65) Prior Publication Data
US 2011/0298746 A1    Dec. 8, 2011

Related U.S. Application Data

(60) Provisional application No. 61/352,310, filed on Jun. 7, 2010.

(51) Int. Cl.
*G06F 3/044* (2006.01)
*G06F 3/041* (2006.01)

(52) U.S. Cl.
CPC ............ *G06F 3/0418* (2013.01); *G06F 3/044* (2013.01)

(58) Field of Classification Search
CPC ............ H03K 17/962; H03K 17/955; H03K 17/9645; G01D 5/24; G06F 3/044; G06F 3/0418
USPC .......... 345/156, 173–179, 204–215, 690–699
See application file for complete search history.

(56) References Cited

U.S. PATENT DOCUMENTS

| | | |
|---|---|---|
| 4,859,814 A | 8/1989 | Sciacero et al. |
| 5,355,149 A * | 10/1994 | Casebolt .................. 345/175 |
| 5,483,261 A | 1/1996 | Yasutake |
| 5,488,204 A | 1/1996 | Mead et al. |
| 5,495,077 A | 2/1996 | Miller et al. |
| 5,818,672 A | 10/1998 | Hilbe |
| 5,825,352 A | 10/1998 | Bisset et al. |
| 5,835,079 A | 11/1998 | Shieh |
| 5,880,411 A | 3/1999 | Gillespie et al. |
| 5,914,465 A | 6/1999 | Allen et al. |
| 5,923,320 A | 7/1999 | Murakami et al. |

(Continued)

FOREIGN PATENT DOCUMENTS

| | | |
|---|---|---|
| CN | 1164286 A | 11/1997 |
| CN | 101604218 A | 12/2009 |

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Kent Chang
*Assistant Examiner* — William Lu
(74) *Attorney, Agent, or Firm* — Morrison & Foerster LLP

(57) ABSTRACT

Error compensation of a touch sensing signal is provided. A touch screen can include a drive region that can be driven by a drive signal, and a sense region that can output a sense signal that includes information of a first amount of touch on or near the touch screen and information of a first amount of error. The first amount of touch can be based on the drive signal. The touch screen can include a compensation sensor that can output a compensation signal that includes information of a second amount of error, and an error compensator that can compensate for the first amount of error in the sense signal based on the second amount of error.

16 Claims, 22 Drawing Sheets

(56) References Cited

U.S. PATENT DOCUMENTS

| | | |
|---|---|---|
| 6,188,391 B1 | 2/2001 | Seely et al. |
| 6,310,610 B1 | 10/2001 | Beaton et al. |
| 6,310,611 B1 | 10/2001 | Caldwell |
| 6,323,846 B1 | 11/2001 | Westerman et al. |
| 6,452,514 B1 | 9/2002 | Philipp |
| 6,570,441 B1 | 5/2003 | Sasaki |
| 6,690,387 B2 | 2/2004 | Zimmerman et al. |
| 7,015,894 B2 | 3/2006 | Morohoshi |
| 7,057,909 B2 | 6/2006 | Fujisaki et al. |
| 7,109,978 B2 | 9/2006 | Gillespie et al. |
| 7,129,714 B2 | 10/2006 | Baxter |
| 7,184,064 B2 | 2/2007 | Zimmerman et al. |
| 7,298,803 B2 | 11/2007 | Alexander |
| 7,663,607 B2 | 2/2010 | Hotelling et al. |
| 8,040,325 B2 * | 10/2011 | Lee et al. ............ 345/173 |
| 8,154,310 B1 * | 4/2012 | Maharyta et al. ........ 324/686 |
| 8,415,958 B2 * | 4/2013 | Hargreaves et al. ........ 324/658 |
| 8,479,122 B2 | 7/2013 | Hotelling et al. |
| 8,614,690 B2 | 12/2013 | Grunthaner |
| 8,698,015 B2 * | 4/2014 | Bateman et al. .......... 178/18.06 |
| 2001/0015711 A1 | 8/2001 | Aoki |
| 2001/0040545 A1 | 11/2001 | Mishima et al. |
| 2003/0127984 A1 | 7/2003 | Kim et al. |
| 2003/0177349 A1 | 9/2003 | Hersh |
| 2004/0095333 A1 | 5/2004 | Morag et al. |
| 2004/0189617 A1 | 9/2004 | Gerpheide et al. |
| 2005/0122119 A1 | 6/2005 | Barlow |
| 2005/0189154 A1 | 9/2005 | Perski et al. |
| 2005/0253598 A1 | 11/2005 | Kawahata |
| 2005/0271326 A1 | 12/2005 | Luo |
| 2006/0007171 A1 | 1/2006 | Burdie et al. |
| 2006/0017710 A1 | 1/2006 | Lee et al. |
| 2006/0026521 A1 | 2/2006 | Hotelling et al. |
| 2006/0197753 A1 | 9/2006 | Hotelling |
| 2006/0284639 A1 | 12/2006 | Reynolds |
| 2007/0046648 A1 * | 3/2007 | Lee et al. ............ 345/173 |
| 2007/0074914 A1 | 4/2007 | Geaghan et al. |
| 2007/0079996 A1 | 4/2007 | Lee et al. |
| 2007/0257894 A1 * | 11/2007 | Philipp ............ 345/173 |
| 2007/0258172 A1 | 11/2007 | Thein et al. |
| 2007/0268272 A1 | 11/2007 | Perski et al. |
| 2008/0006453 A1 | 1/2008 | Hotelling |
| 2008/0007529 A1 | 1/2008 | Paun et al. |
| 2008/0047764 A1 | 2/2008 | Lee et al. |
| 2008/0062139 A1 * | 3/2008 | Hotelling et al. ............ 345/173 |
| 2008/0088595 A1 | 4/2008 | Liu et al. |
| 2008/0100586 A1 * | 5/2008 | Smart ............ 345/173 |
| 2008/0127739 A1 | 6/2008 | DeAngelis et al. |
| 2008/0157893 A1 | 7/2008 | Krah |
| 2008/0158175 A1 * | 7/2008 | Hotelling et al. ............ 345/173 |
| 2008/0158176 A1 * | 7/2008 | Land et al. ............ 345/173 |
| 2008/0158178 A1 | 7/2008 | Hotelling et al. |
| 2008/0158182 A1 | 7/2008 | Westerman |
| 2008/0164076 A1 | 7/2008 | Orsley |
| 2008/0180399 A1 | 7/2008 | Cheng |
| 2008/0246496 A1 * | 10/2008 | Hristov et al. ............ 324/686 |
| 2008/0278178 A1 * | 11/2008 | Philipp ............ 324/662 |
| 2009/0085894 A1 | 4/2009 | Gandhi et al. |
| 2009/0127003 A1 | 5/2009 | Geaghan |
| 2009/0129112 A1 | 5/2009 | Shamitz et al. |
| 2010/0066391 A1 | 3/2010 | Hirasaka et al. |
| 2010/0073301 A1 * | 3/2010 | Yousefpor et al. ............ 345/173 |
| 2010/0079401 A1 | 4/2010 | Staton |
| 2010/0079402 A1 | 4/2010 | Grunthaner |
| 2010/0085322 A1 | 4/2010 | Mamba et al. |
| 2010/0110038 A1 * | 5/2010 | Mo et al. ............ 345/174 |
| 2010/0220075 A1 * | 9/2010 | Kuo et al. ............ 345/174 |
| 2010/0238133 A1 * | 9/2010 | Wu et al. ............ 345/174 |
| 2010/0259502 A1 * | 10/2010 | Ema et al. ............ 345/174 |
| 2010/0271330 A1 * | 10/2010 | Philipp ............ 345/174 |
| 2010/0301879 A1 | 12/2010 | Philipp |
| 2010/0307840 A1 * | 12/2010 | Kobayashi et al. ......... 178/18.06 |
| 2010/0321043 A1 * | 12/2010 | Philipp et al. ............ 324/686 |
| 2011/0022351 A1 | 1/2011 | Philipp et al. |
| 2011/0175823 A1 * | 7/2011 | Vieta ............ 345/173 |
| 2011/0298746 A1 | 12/2011 | Hotelling |
| 2012/0026123 A1 | 2/2012 | Grunthaner et al. |

FOREIGN PATENT DOCUMENTS

| | | |
|---|---|---|
| EP | 0 684 580 A2 | 11/1995 |
| EP | 0 706 147 A2 | 4/1996 |
| EP | 1 496 467 A2 | 1/2005 |
| JP | 05-006153 A | 1/1993 |
| JP | 09-018321 A | 1/1997 |
| JP | 09-292950 A | 11/1997 |
| JP | 10-312244 | 11/1998 |
| JP | 2000-163031 A | 6/2000 |
| JP | 2002-342033 A | 11/2002 |
| JP | 2007-157371 A | 6/2007 |
| WO | WO-2005/114369 A2 | 12/2005 |
| WO | WO-2009/000289 A1 | 12/2008 |
| WO | WO-2009/027629 A1 | 3/2009 |
| WO | WO-2010/036649 A2 | 4/2010 |
| WO | WO-2010/036651 A2 | 4/2010 |
| WO | WO-2012/015707 A1 | 2/2012 |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Final Office Action mailed Mar. 30, 2012, for U.S. Appl. No. 12/239,622, filed Sep. 26, 2008, 17 pages.

Final Office Action mailed Apr. 5, 2012, for U.S. Appl. No. 12/239,594, filed Sep. 26, 2008, 57 pages.

Final Office Action mailed Apr. 11, 2013, for U.S. Appl. No. 12/239,594, filed Sep. 26, 2008, 32 pages.

Final Office Action mailed May 15, 2013, for U.S. Appl. No. 12/239,622, filed Sep. 26, 2008, 24 pages.

Final Office Action mailed Aug. 5, 2013, for U.S. Appl. No. 12/848,032, filed Jul. 30, 2010, 16 pages.

Final Office Action mailed Oct. 24, 2013, for U.S. Appl. No. 12/239,594, filed Sep. 26, 2008, 26 pages.

International Search Report mailed Feb. 23, 2011, for PCT Application No. PCT/US2009/057850, filed Sep. 22, 2009, four pages.

International Search Report mailed May 3, 2011, for PCT Application No. PCT/US2009/057853, filed Sep. 22, 2009, six pages.

International Search Report mailed Sep. 16, 2011, for PCT Application No. PCT/US11/45120, filed Jul. 22, 2011, three pages.

Non-Final Office Action mailed Aug. 17, 2011, for U.S. Appl. No. 12/239,594, filed Sep. 26, 2008, 35 pages.

Non-Final Office Action mailed Aug. 24, 2011, for U.S. Appl. No. 12/239,622, filed Sep. 26, 2008, 22 pages.

Non-Final Office Action mailed Feb. 6, 2013, for U.S. Appl. No. 12/848,032, filed Jul. 30, 2010, 15 pages.

Non-Final Office Action mailed Mar. 7, 2013, for U.S. Appl. No. 12/239,622, filed Sep. 26, 2008, 22 pages.

Non-Final Office Action mailed Feb. 6, 2014, for U.S. Appl. No. 12/239,594, filed Sep. 26, 2008, 36 pages.

Notice of Allowance mailed Sep. 10, 2013, for U.S. Appl. No. 12/239,622, filed Sep. 26, 2008, 14 pages.

Partial European Search Report mailed Mar. 21, 2012, for EP Application No. 11175801.7, eight pages.

Final Office Action mailed Sep. 18, 2014, for U.S. Appl. No. 12/239,594, filed Sep. 26, 2008, 38 pages.

* cited by examiner

TOUCH SENSING ERROR COMPENSATION

CROSS REFERENCE TO RELATED APPLICATIONS

This application claims benefit of U.S. Provisional Application No. 61/352,310, filed Jun. 7, 2010, the contents of which are incorporated by reference herein in their entirety for all purposes.

FIELD OF THE DISCLOSURE

This relates generally to touch sensing, and more particularly, compensating for errors in touch sensing.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing fields used to detect touch can extend beyond the surface of the display, and objects approaching near the surface may be detected near the surface without actually touching the surface.

Capacitive touch sensor panels can be formed from a matrix of drive and sense lines of a substantially transparent conductive material, such as Indium Tin Oxide (ITO), often arranged in rows and columns in horizontal and vertical directions on a substantially transparent substrate. It is due in part to their substantial transparency that capacitive touch sensor panels can be overlaid on a display to form a touch screen, as described above. Some touch screens can be formed by integrating touch sensing circuitry into a display pixel stackup (i.e., the stacked material layers forming the display pixels).

SUMMARY

The following description includes examples of compensating for errors that can occur in touch sensing due to various error mechanisms. In one example embodiment, a compensation sensor can be included in a touch sensing device. The characteristics of the compensation sensor, such as size, shape, location in the device, electrical connections, material composition, etc., can be selected such that the compensation sensor can satisfy two criteria. First, the compensation sensor can provide information about the error in touch sensing. Second, in proportion to the relative sensitivities to the error of the compensation and touch sensors, the compensation sensor can be less sensitive to touch than the touch sensor. In this way, the error in the touch sensing signal can be compensated by, for example, subtracting the compensation signal from the touch sensing signal in some predetermined ratio.

In some embodiments, a touch screen can include a drive region that is driven by a drive signal, a sense region that outputs a sense signal that includes information of a first amount of touch on or near the touch screen and information of a first amount of error, the first amount of touch being based on the drive signal, and a compensation sensor that outputs a compensation signal that includes information of a second amount of error. An error compensator can compensate for the first amount of error in the sense signal based on the second amount of error.

In another example, an amount of error introduced into a touch sensing signal by a known and/or controlled error source can be measured over a range of values of the error source to produce, for example, a list including a predetermined error value for each of the range of values of the error source. For example, if it is known that an amount of error introduced into the touch sensing signal of a touch pixel of a touch screen depends on a state of the touch screen, such as the average luminance values of the display pixels in the touch pixel, the amount of error may be measured at different values of average luminance, and stored in a look-up table (LUT) in a computer-readable medium of the device. For example, it can be determined whether a difference in average luminance values of two or more regions of display pixels satisfies a first criteria. For example, a large difference in luminance between particular regions could indicate that a particular "worst-case" image is currently being displayed, the worst-case image being an image that has been determined to affect the accuracy of an error compensation based on the compensation signal. In some embodiments, if a worst-case image is determined, error compensation can be based on a predetermined error value, for example. In this way, it can be possible to provide error compensation without the need for a compensation sensor that is coupled to the same or similar error mechanism as the touch sensor and having proportionately less touch sensitivity than the touch sensor, which can be beneficial in situations in which the particular error mechanism is unknown, which can make design and implementation of a compensation sensor more difficult.

DETAILED DESCRIPTION

Figure 1C:
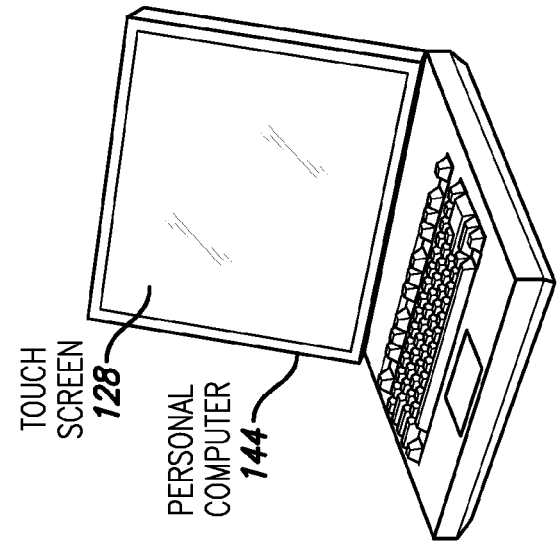
FIGS. 1A-1C illustrate an example mobile telephone, an example media player, and an example personal computer that each include an example touch screen according to embodiments of the disclosure.

In the following description of example embodiments, reference is made to the accompanying drawings which form a part hereof, and in which it is shown by way of illustration specific embodiments in which embodiments of the disclosure can be practiced. It is to be understood that other embodiments can be used and structural changes can be made without departing from the scope of the embodiments of this disclosure.

The following description includes examples in which errors in touch sensing due to various error mechanisms can be compensated. Touch sensing circuitry in devices such as touch panels, touch screens, etc., can be exposed to various sources of error that can enter the touch sensing system through various error mechanisms. For example, touch sensing circuitry can operate alongside other types of circuitry, such as in a touch screen formed by a touch panel overlay on a display screen. Close proximity of touch and display circuitry may cause undesirable interference with touch sensing. Other sources of error can include temperature, ambient light, non-uniformity of construction during manufacture (particularly gradually changing non-uniformities, such as, for example, dielectric thickness non-uniformity, mobility of TFT gradient across the mother glass, etc.), degradation of components due to age, etc. Sources of error can enter the touch sensing system through mechanisms. For example, a localized change in the temperature of a touch screen may change a capacitance of a transistor of a display system, which may increase an undesired capacitive coupling in a touch sensing system. In another example, a display system of a touch screen may change a voltage across a liquid crystal cell to display an image, but the voltage change can cause the dielectric constant of the liquid crystal to change in a way that introduces error in the touch sensing system.

Errors in touch sensing can include any portion of a touch sensing measurement that does not carry information about touch. A touch sensing signal output from a touch sensor can be a composite signal, for example, that includes one or more signals caused by a touch, and carrying touch information about the touch, and one or more signals caused by other sources, such as electrical interference, crosstalk, etc., that do not provide information about the touch. Some error sources can cause a change in the operation of touch sensing that causes the portion of the touch sensing signal that carries touch information to inaccurately reflect the amount of touch. For example, an error source could cause a drive signal to be generated with an abnormally high voltage, which could result in the sense signal sensing a touch to be abnormally high as well. Thus, a portion of the touch information itself could include an error.

As touch sensing circuitry becomes more closely integrated with circuitry of other systems, undesirable interaction between circuit elements of different systems can be more likely to occur. For example, touch sensing circuitry can be integrated into the display pixel stackups of integrated touch screens. Display pixel stackups are typically manufactured by processes including depositing, masking, etching, doping, etc., of materials such as conductive materials (e.g., metal, substantially transparent conductors), semiconductive materials (e.g., polycrystalline silicon (Poly-Si)), and dielectric materials (e.g., SiO2, organic materials, SiNx). Various elements formed within a display pixel stackup can operate as circuitry of the display system to generate an image on the display, while other elements can operate as circuitry of a touch sensing system that senses one or more touches on or near the display.

The following description includes examples in which the errors in touch sensing introduced through various error mechanisms can be compensated. In one example, a compensation sensor can be included in a touch sensing device. The characteristics of the compensation sensor, such as size, shape, location in the device, electrical connections, material composition, etc., can be selected such that the compensation sensor can satisfy two criteria. First, the compensation sensor can provide information about the error in touch sensing. For example, the compensation sensor can be coupled to the same or similar error mechanism as a touch sensor of the device, such that a compensation signal output by the compensation sensor can be affected by the same or similar error as the touch sensing signal output by the touch sensor. Second, in proportion to the relative sensitivities to the error of the compensation and touch sensors, the compensation sensor can be less sensitive to touch than the touch sensor. In other words, the compensation sensor can measure a higher ratio of error to touch than the touch sensor. In this way, the error in the touch sensing signal can be compensated by, for example, subtracting the compensation signal from the touch sensing signal in some predetermined ratio. The predetermined ratio can be based on a number of factors, such as relative sizes of the compensation and touch sensors, the particular error mechanism or mechanisms, etc. The ratio can be determined empirically, for example, and stored in a computer-readable medium of the device. In some examples, the ratio can vary depending on a number of operational factors, and in these examples, a range of ratio values can be stored, and the appropriate ratio value can be selected for an error compensation operation. Using one or more compensation sensors in this way can, for example, provide a real-time measurement of one or more errors being introduced into a touch sensing signal.

In another example, an amount of error introduced into a touch sensing signal by a known and/or controlled error source can be measured over a range of values of the error source to produce, for example, a list including a predetermined error value for each of the range of values of the error source. For example, if it is known that an amount of error introduced into the touch sensing signal of a touch pixel of a touch screen depends on the average luminance values of the display pixels in the touch pixel, the amount of error may be measured at different values of average luminance, and stored in a look-up table (LUT) in a computer-readable medium of the device. This process may be performed once, for example, during a device calibration at the factory. During operation, the device can scan the frame buffer, which can contain the current luminance values of the display pixels, read out the luminance values for a particular touch pixel, determine the average luminance for the touch pixel, read the corresponding error value from the LUT, and compensate the current touch sensing signal of the touch pixel with the read-out error value. In this example, it may not be necessary that the particular error mechanism by which the luminance of the display pixels introduces error in the touch sensing signal is known, so long as an amount of error resulting from the luminance values can be determined. In this way, it can be possible to provide error compensation without the need for a compensation sensor that is coupled to the same or similar error mechanism as the touch sensor and having proportionately less touch sensitivity than the touch sensor, which can be beneficial in situations in which the particular error mechanism is unknown, which can make design and implementation of a compensation sensor more difficult.

Luminance values of display pixels are an example of a controlled (and therefore known) error source, because the device itself controls the luminance values. In some example embodiments, error sources can be known, but not controlled. For example, it may be known that the temperature of the display pixels of a touch pixel of a touch screen can introduce different errors over a range of temperature values. Even though the particular error mechanism causing the temperature-dependent error may not be known, it can be possible to include one or more temperature sensors in the touch screen to allow the temperature values of the touch pixels to be measured and known during operation. Similar to the preceding example, a LUT storing predetermined error values measured during a calibration process at different temperatures can be used to compensate for errors resulting from temperature variance. As in the preceding example, it may not be necessary to include a compensation sensor coupled to the same or similar error mechanism as the touch sensor and having proportionately less touch sensitivity than the touch sensor.

In some example embodiments, a combination of one or more compensation sensors and predetermined-stored error values can be used. For example, compensation sensors can be used to compensate for error related to one type of error source, while predetermined error values can be used to compensate for error related to another type of error source. In some example embodiments, compensation sensors and predetermined error values can be used to compensate for the same type of error, for example, by combining the two types of error compensation, by averaging, for example. In some example embodiments, one or the other of the two types of compensation can be used to compensate a given touch sensing signal. In one touch screen embodiment, for example, compensation sensors can be positioned in a touch screen to sense error related to display pixel luminance. However, there may be some images for which the particular arrangement of luminances makes it difficult for the compensation sensors to accurately sense the error. If these worst-case images are known, the luminance-dependent errors may be predetermined at the factory, for example, for the worst-case images and stored in a LUT. During operation, the compensation sensors can be used unless the device displays a worst-case image, in which case the device can switch to the predetermined error LUT for compensation information.

Although example embodiments are described below in relation to integrated touch screens, other types of touch sensing arrangements can be used, for example, non-integrated touch screens, touchpads, etc.

Figure 1B:
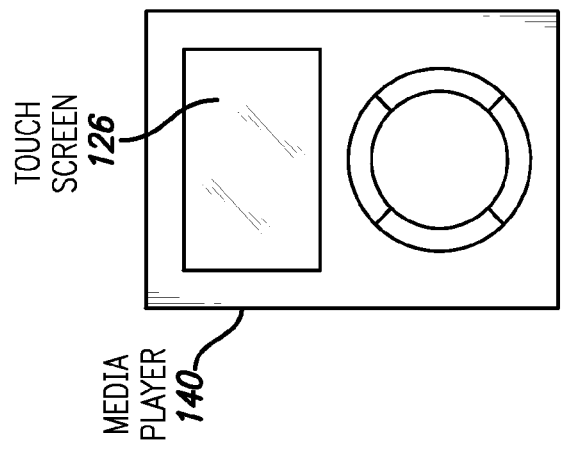
Figure 1A:
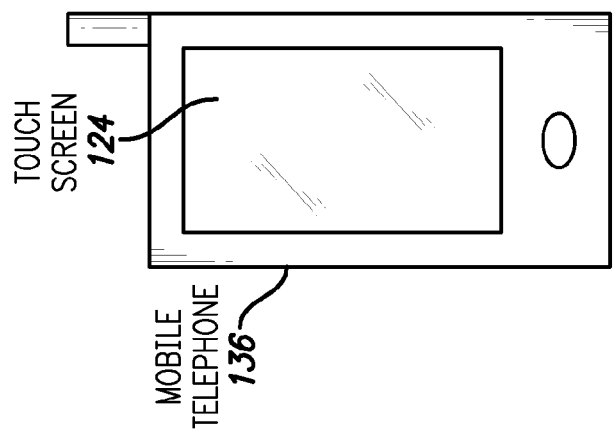

FIGS. 1A-1C show example systems in which a touch screen according to embodiments of the disclosure may be implemented. FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. Touch screens 124, 126, and 128 may be based on, for example, self capacitance or mutual capacitance, or another touch sensing technology. For example, in a self capacitance based touch system, an individual electrode with a self-capacitance to ground can be used to form a touch pixel for detecting touch. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by a touch sensing system to determine the positions of multiple objects when they touch the touch screen. A mutual capacitance based touch system can include, for example, drive regions and sense regions, such as drive lines and sense lines. For example, drive lines can be formed in rows while sense lines can be formed in columns (e.g., orthogonal). Touch pixels can be formed at the intersections of the rows and columns. During operation, the rows can be stimulated with an AC waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some embodiments, a touch screen can be multi-touch, single touch, projection scan, full-imaging multi-touch, or any capacitive touch.

Figure 2:
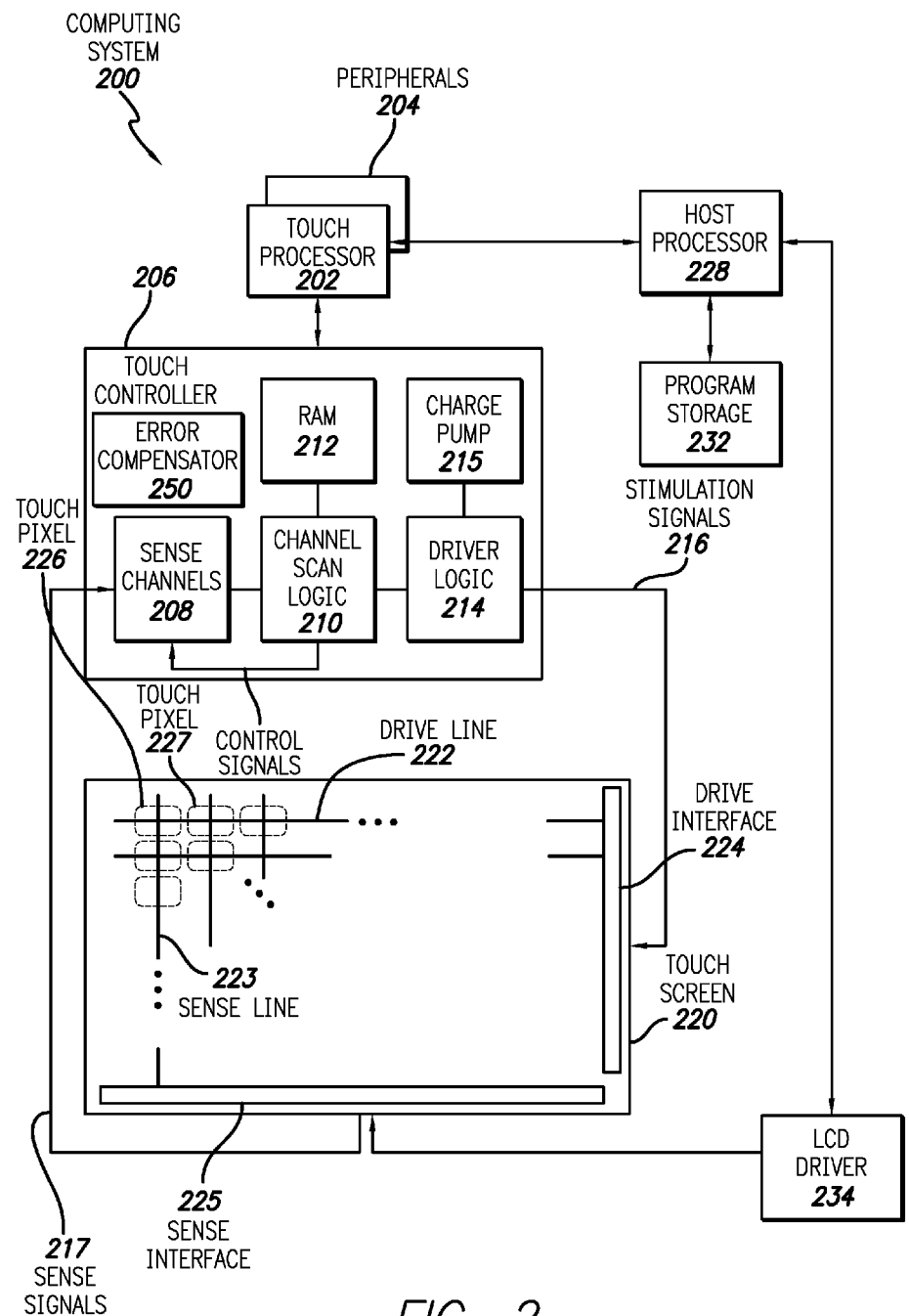
FIG. 2 is a block diagram of an example computing system that illustrates one implementation of an example touch screen according to embodiments of the disclosure.

FIG. 2 is a block diagram of an example computing system 200 that illustrates one implementation of an example touch screen 220 according to embodiments of the disclosure. Computing system 200 could be included in, for example, mobile telephone 136, digital media player 140, personal computer 144, or any mobile or non-mobile computing device that includes a touch screen. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and phases that can be selectively applied to drive regions of the touch sensing circuitry of touch screen 220, as described in more detail below. In some embodiments, touch controller 206, touch processor 202 and peripherals 204 can be integrated into a single application specific integrated circuit (ASIC). Touch controller 206 can also include an error compensator 250, which is described in more detail below.

Computing system 200 can also include a host processor 228 for receiving outputs from touch processor 202 and performing actions based on the outputs. For example, host processor 228 can be connected to program storage 232 and a display controller, such as an LCD driver 234. Host processor 228 can use LCD driver 234 to generate an image on touch screen 220, such as an image of a user interface (UI), and can use touch processor 202 and touch controller 206 to detect a touch on or near touch screen 220, such a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Touch screen 220 can include touch sensing circuitry that can include a capacitive sensing medium having a plurality of drive lines 222 and a plurality of sense lines 223. It should be noted that the term "lines" is a sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 (also referred to as an event detection and demodulation circuit) in touch controller 206. In this way, drive lines and sense lines can be part of the touch sensing circuitry that can interact to form capacitive sensing nodes, which can be thought of as touch picture elements (touch pixels), such as touch pixels 226 and 227. This way of understanding can be particularly useful when touch screen 220 is viewed as capturing an "image" of touch. In other words, after touch controller 206 has determined whether a touch has been detected at each touch pixel in the touch screen, the pattern of touch pixels in the touch screen at which a touch occurred can be thought of as an "image" of touch (e.g. a pattern of fingers touching the touch screen).

Figure 3:
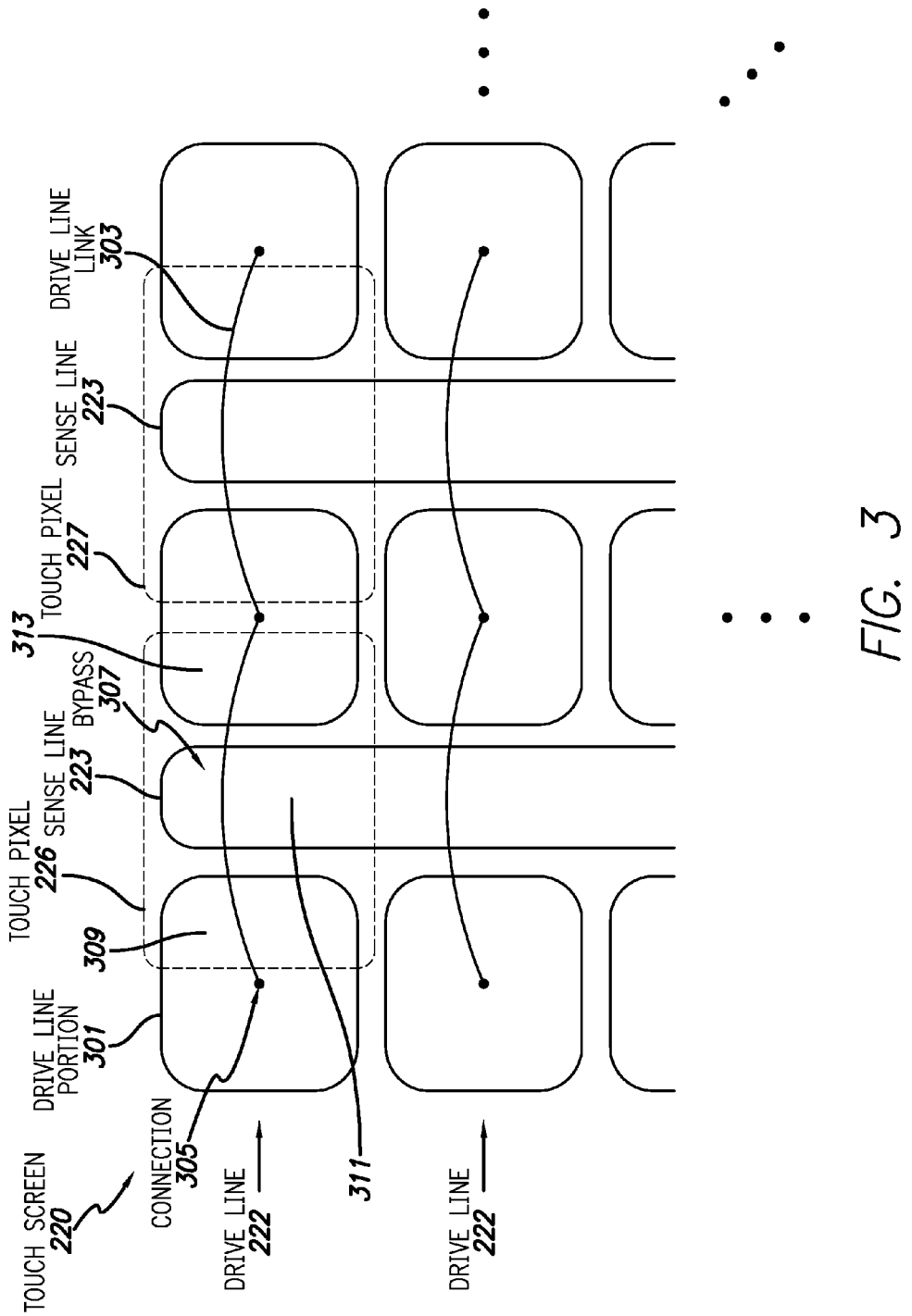
FIG. 3 is a more detailed view of the touch screen of FIG. 2 showing an example configuration of drive lines and sense lines according to embodiments of the disclosure.

In some example embodiments, touch screen 220 can be an integrated touch screen in which touch sensing circuit elements of the touch sensing system can be integrated into the display pixels stackups of a display. An example integrated touch screen in which embodiments of the disclosure can be implemented with now be described with reference to FIGS. 3-6. FIG. 3 is a more detailed view of touch screen 220 showing an example configuration of drive lines 222 and sense lines 223 according to embodiments of the disclosure. As shown in FIG. 3, each drive line 222 can be formed of one or more drive line segments 301 that can be electrically connected by drive line links 303 at connections 305. Drive line links 303 are not electrically connected to sense lines 223, rather, the drive line links can bypass the sense lines through bypasses 307. Drive lines 222 and sense lines 223 can interact capacitively to form touch pixels such as touch pixels 226 and 227. Drive lines 222 (i.e., drive line segments 301 and corresponding drive line links 303) and sense lines 223 can be formed of electrical circuit elements in touch screen 220. In the example configuration of FIG. 3, each of touch pixels 226 and 227 can include a portion of one drive line segment 301, a portion of a sense line 223, and a portion of another drive line segment 301. For example, touch pixel 226 can include a right-half portion 309 of a drive line segment on one side of a portion 311 of a sense line, and a left-half portion 313 of a drive line segment on the opposite side of portion 311 of the sense line.

Figure 4:
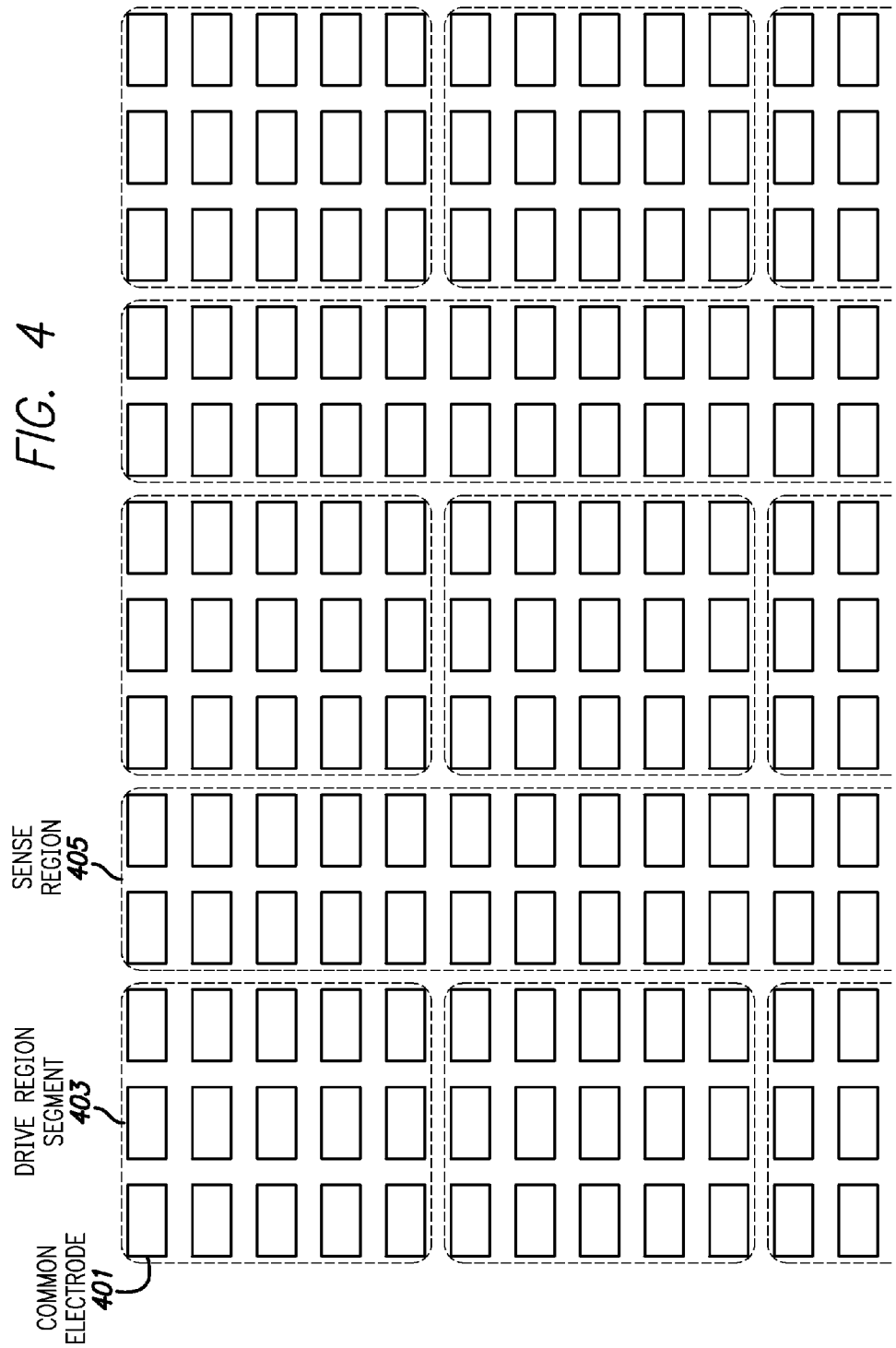
FIG. 4 illustrates an example configuration in which touch sensing circuitry includes common electrodes (Vcom) according to embodiments of the disclosure.

The circuit elements can include, for example, elements that can exist in conventional LCD displays, as described above. It is noted that circuit elements are not limited to whole circuit components, such a whole capacitor, a whole transistor, etc., but can include portions of circuitry, such as only one of the two plates of a parallel plate capacitor. FIG. 4 illustrates an example configuration in which common electrodes (Vcom) can form portions of the touch sensing circuitry of a touch sensing system. Each display pixel includes a common electrode 401, which is a circuit element of the display system circuitry in the pixel stackup (i.e., the stacked material layers forming the display pixels) of the display pixels of some types of conventional LCD displays, e.g., fringe field switching (FFS) displays, that can operate as part of the display system to display an image.

In the example shown in FIG. 4, each common electrode (Vcom) 401 can serve as a multi-function circuit element that can operate as display circuitry of the display system of touch screen 220 and can also operate as touch sensing circuitry of the touch sensing system. In this example, each common electrode 401 can operate as a common electrode of the display circuitry of the touch screen, and can also operate together when grouped with other common electrodes as touch sensing circuitry of the touch screen. For example, a group of common electrodes 401 can operate together as a capacitive part of a drive line or a sense line of the touch sensing circuitry during the touch sensing phase. Other circuit elements of touch screen 220 can form part of the touch sensing circuitry by, for example, electrically connecting together common electrodes 401 of a region, switching electrical connections, etc. In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some embodiments, some of the circuit elements in the display pixel stackups can be multi-function circuit elements and other circuit elements may be single-function circuit elements. In other embodiments, all of the circuit elements of the display pixel stackups may be single-function circuit elements.

In addition, although example embodiments herein may describe the display circuitry as operating during a display phase, and describe the touch sensing circuitry as operating during a touch sensing phase, it should be understood that a display phase and a touch sensing phase may be operated at the same time, e.g., partially or completely overlap, or the display phase and touch phase may operate at different times. Also, although example embodiments herein describe certain circuit elements as being multi-function and other circuit elements as being single-function, it should be understood that the circuit elements are not limited to the particular functionality in other embodiments. In other words, a circuit element that is described in one example embodiment herein as a single-function circuit element may be configured as a multi-function circuit element in other embodiments, and vice versa.

For example, FIG. 4 shows common electrodes 401 grouped together to form drive region segments 403 and sense regions 405 that generally correspond to drive line segments 301 and sense lines 223, respectively. Grouping multi-function circuit elements of display pixels into a region can mean operating the multi-function circuit elements of the display pixels together to perform a common function of the region. Grouping into functional regions may be accomplished through one or a combination of approaches, for example, the structural configuration of the system (e.g., physical breaks and bypasses, voltage line configurations), the operational configuration of the system (e.g., switching circuit elements on/off, changing voltage levels and/or signals on voltage lines), etc.

Multi-function circuit elements of display pixels of the touch screen can operate in both the display phase and the touch phase. For example, during a touch phase, common electrodes 401 can be grouped together to form touch signal lines, such as drive regions and sense regions. In some embodiments circuit elements can be grouped to form a continuous touch signal line of one type and a segmented touch signal line of another type. For example, FIG. 4 shows one example embodiment in which drive region segments 403 and sense regions 405 correspond to drive line segments 301 and sense lines 223 of touch screen 220. Other configurations are possible in other embodiments, for example, common electrodes 401 could be grouped together such that drive lines are each formed of a continuous drive region and sense lines are each formed of a plurality of sense region segments linked together through connections that bypass a drive region.

The drive regions in the example of FIG. 3 are shown in FIG. 4 as rectangular regions including a plurality of common electrodes of display pixels, and the sense regions of FIG. 3 are shown in FIG. 4 as rectangular regions including a plurality of common electrodes of display pixels extending the vertical length of the LCD. In some embodiments, a touch pixel of the configuration of FIG. 4 can include, for example, a 64×64 area of display pixels. However, the drive and sense regions are not limited to the shapes, orientations, and positions shown, but can include any suitable configurations according to embodiments of the disclosure. It is to be understood that the display pixels used to form the touch pixels are not limited to those described above, but can be any suitable size or shape to permit touch capabilities according to embodiments of the disclosure.

Figure 5:
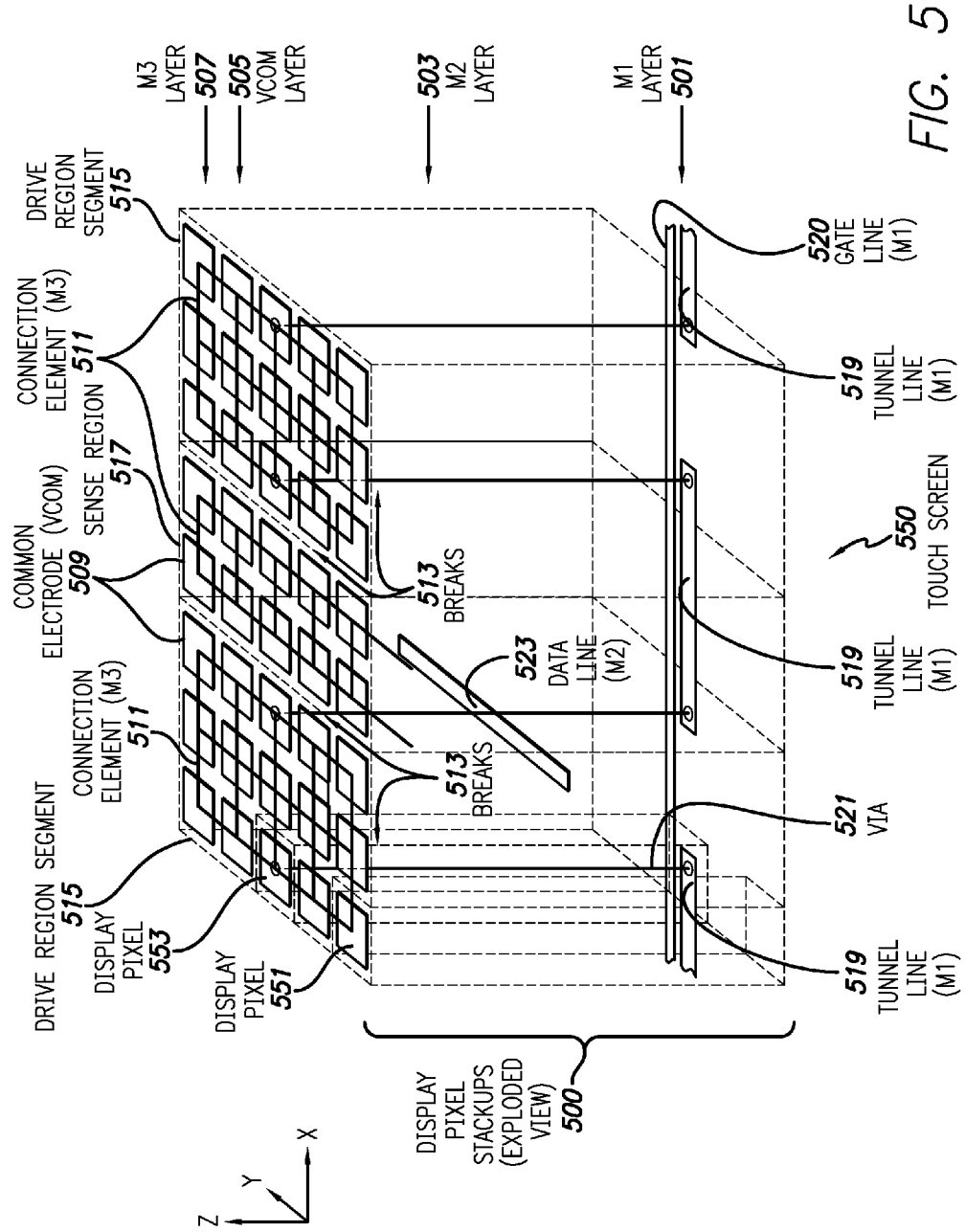
FIG. 5 illustrates an exploded view of example display pixel stackups according to embodiments of the disclosure.

FIG. 5 is a three-dimensional illustration of an exploded view (expanded in the z-direction) of example display pixel stackups 500 showing some of the elements within the pixel stackups of an example integrated touch screen 550. Stackups 500 can include a configuration of conductive lines that can be used to group common electrodes, such as common electrodes 401, into drive region segments and sense regions, such as shown in FIG. 4, and to link drive region segments to form drive lines.

Stackups 500 can include elements in a first metal (M1) layer 501, a second metal (M2) layer 503, a common electrode (Vcom) layer 505, and a third metal (M3) layer 507. Each display pixel can include a common electrode 509, such as common electrodes 401 in FIG. 4, that is formed in Vcom layer 505. M3 layer 507 can include connection element 511 that can electrically connect together common electrodes 509. In some display pixels, breaks 513 can be included in connection element 511 to separate different groups of common electrodes 509 to form drive region segments 515 and a sense region 517, such as drive region segments 403 and sense region 405, respectively. Breaks 513 can include breaks in the x-direction that can separate drive region segments 515 from sense region 517, and breaks in the y-direction that can separate one drive region segment 515 from another drive region segment. M1 layer 501 can include tunnel lines 519 that can electrically connect together drive region segments 515 through connections, such as conductive vias 521, which can electrically connect tunnel line 519 to the grouped common electrodes in drive region segment display pixels. Tunnel line 519 can run through the display pixels in sense region 517 with no connections to the grouped common electrodes in the sense region, e.g., no vias 521 in the sense region. The M1 layer can also include gate lines 520. M2 layer 503 can include data lines 523. Only one gate line 520 and one data line 523 are shown for the sake of clarity; however, a touch screen can include a gate line running through each horizontal row of display pixels and multiple data lines running through each vertical row of display pixels, for example, one data line for each red, green, blue (RGB) color sub-pixel in each pixel in a vertical row of an RGB display integrated touch screen.

Structures such as connection elements 511, tunnel lines 519, and conductive vias 521 can operate as a touch sensing circuitry of a touch sensing system to detect touch during a touch sensing phase of the touch screen. Structures such as data lines 523, along with other pixel stackup elements such as transistors, pixel electrodes, common voltage lines, data lines, etc. (not shown), can operate as display circuitry of a display system to display an image on the touch screen during a display phase. Structures such as common electrodes 509 can operate as multifunction circuit elements that can operate as part of both the touch sensing system and the display system.

For example, in operation during a touch sensing phase, gate lines 520 can be clamped to a fixed voltage while stimulation signals can be transmitted through a row of drive region segments 515 connected by tunnel lines 519 and conductive vias 521 to form electric fields between the stimulated drive region segments and sense region 517 to create touch pixels, such as touch pixel 226 in FIG. 2. In this way, the row of connected together drive region segments 515 can operate as a drive line, such as drive line 222, and sense region 517 can operate as a sense line, such as sense line 223. When an object such as a finger approaches or touches a touch pixel, the object can affect the electric fields extending between the drive region segments 515 and the sense region 517, thereby reducing the amount of charge capacitively coupled to the sense region. This reduction in charge can be sensed by a sense channel of a touch sensing controller connected to the touch screen, such as touch controller 206 shown in FIG. 2, and stored in a memory along with similar information of other touch pixels to create an "image" of touch.

Figure 6:
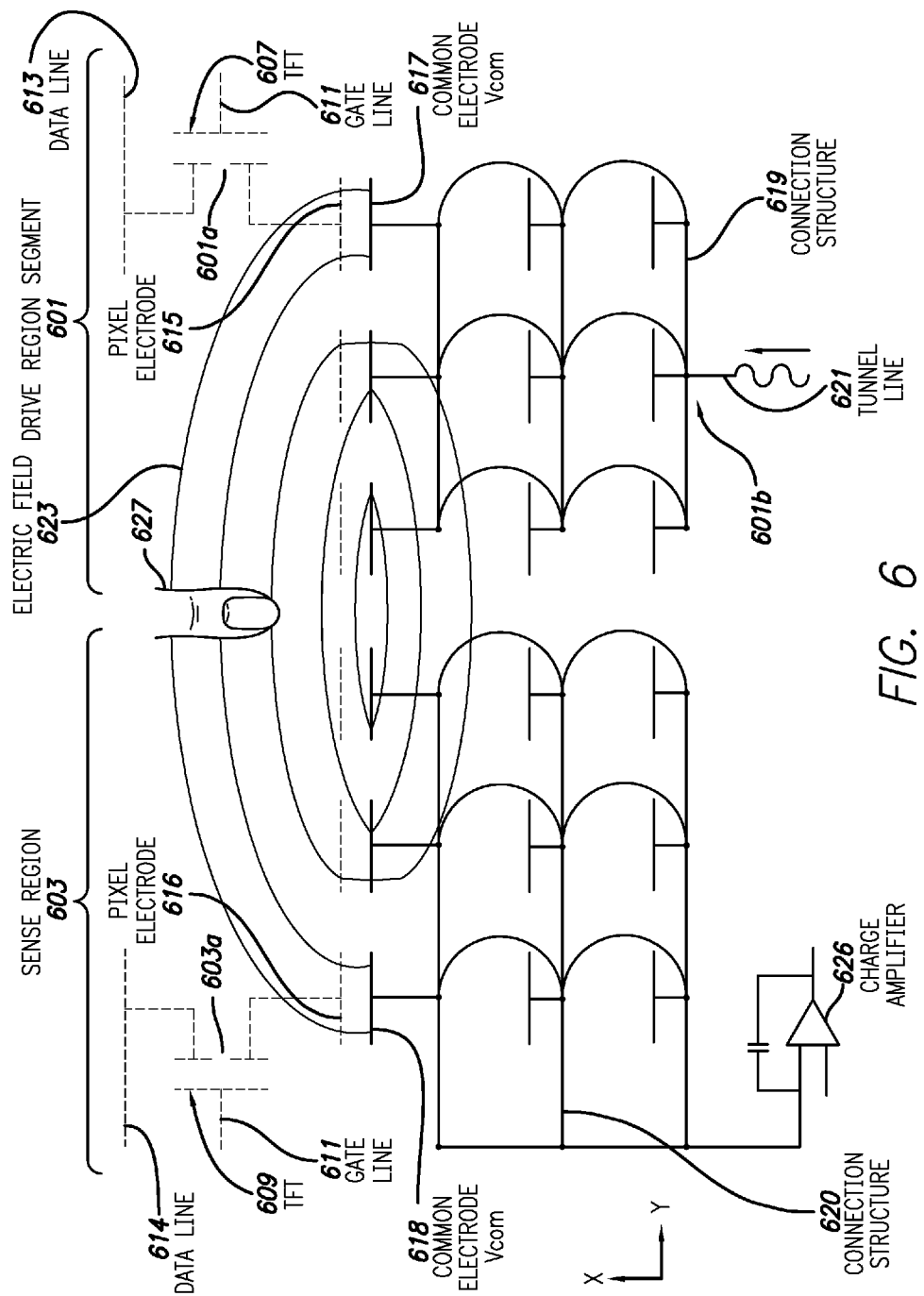
FIG. 6 illustrates an example touch sensing operation according to embodiments of the disclosure.

A touch sensing operation according to embodiments of the disclosure will be described with reference to FIG. 6. FIG. 6 shows partial circuit diagrams of some of the touch sensing circuitry within display pixels in a drive region segment 601 and a sense region 603 of an example touch screen according to embodiments of the disclosure. For the sake of clarity, only one drive region segment is shown. Also for the sake of clarity, FIG. 6 includes circuit elements illustrated with dashed lines to signify some circuit elements operate primarily as part of the display circuitry and not the touch sensing circuitry. In addition, a touch sensing operation is described primarily in terms of a single display pixel 601a of drive region segment 601 and a single display pixel 603a of sense region 603. However, it is understood that other display pixels in drive region segment 601 can include the same touch sensing circuitry as described below for display pixel 601a, and the other display pixels in sense region 603 can include the same touch sensing circuitry as described below for display pixel 603a. Thus, the description of the operation of display pixel 601a and display pixel 603a can be considered as a description of the operation of drive region segment 601 and sense region 603, respectively.

Referring to FIG. 6, drive region segment 601 includes a plurality of display pixels including display pixel 601a. Display pixel 601a can include a TFT 607, a gate line 611, a data line 613, a pixel electrode 615, and a common electrode 617. FIG. 6 shows common electrode 617 connected to the common electrodes in other display pixels in drive region segment 601 through a connection element 619 within the display pixels of drive region segment 601 that is used for touch sensing as described in more detail below. Sense region 603 includes a plurality of display pixels including display pixel 603a. Display pixel 603a includes a TFT 609, a data line 614, a pixel electrode 616, and a common electrode 618. TFT 609 can be connected to the same gate line 611 as TFT 607. FIG. 6 shows common electrode 618 connected to the common electrodes in other display pixels in sense region 603 through a connection element 620 that can be connected, for example, in a border region of the touch screen to form an element within the display pixels of sense region 603 that is used for touch sensing as described in more detail below.

During a touch sensing phase, drive signals can be applied to common electrodes 617 through a tunnel line 621 that is electrically connected to a portion of connection element 619 within a display pixel 601b of drive region segment 601. The drive signals, which are transmitted to all common electrodes 617 of the display pixels in drive region segment 601 through connection element 619, can generate an electrical field 623 between the common electrodes of the drive region segment and common electrodes 618 of sense region 603, which can be connected to a sense amplifier, such as a charge amplifier 626. Electrical charge can be injected into the structure of connected common electrodes of sense region 603, and charge amplifier 626 converts the injected charge into a voltage that can be measured. The amount of charge injected, and consequently the measured voltage, can depend on the proximity of a touch object, such as a finger 627, to the drive and sense regions. In this way, the measured voltage can provide an indication of touch on or near the touch screen.

Referring again to FIG. 5, it can be seen from FIG. 5 that some display pixels of touch screen 550 include different elements than other display pixels. For example, a display pixel 551 can include a portion of connection element 511 that has breaks 513 in the x-direction and the y-direction, and display pixel 551 does not include tunnel line 519. A display pixel 553 can include a portion of connection element 511 that has a break 513 in the x-direction, but not in the y-direction, and can include a portion of tunnel line 519 and a via 521. Other display pixels can include other differences in the configuration of stackup elements including, for example, no breaks 513 in connection element 511, a portion of tunnel line 519 without a via 521, etc. Differences in the configurations of the elements in display pixel stackups can result in different error mechanisms, as described in some examples below in more detail.

Figure 7:
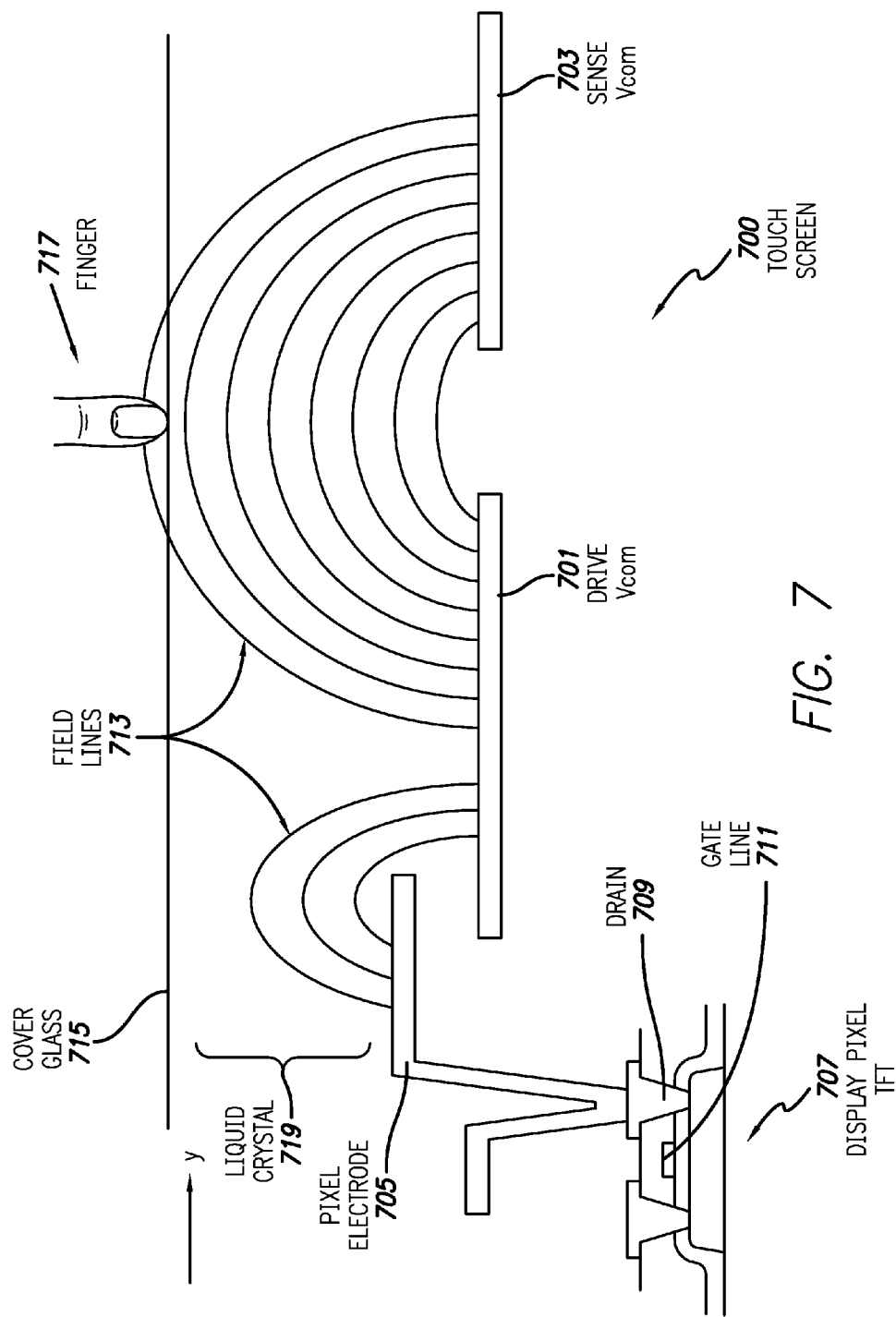
FIG. 7 illustrates a portion of an example touch screen during a touch sensing phase according to embodiments of the disclosure.

FIG. 7 illustrates one example structure of a display pixel according to one embodiment of the disclosure. FIG. 7 shows a touch screen 700 that can include a drive Vcom 701, a sense Vcom 703, and a pixel electrode 705. The pixel electrode 705 can be connected to a display pixel TFT 707 through a drain 709. Display pixel TFT 707 can include a gate line 711, which can be a common gate line to the sense Vcom 703 (although not shown in the figure). During a touch sensing phase, gate line 711 can be clamped to a fixed voltage VGL. Drive Vcom can be driven by a drive signal, which can generate field lines 713. Some of field lines 713 can exit a cover glass 715 and reach finger 717. The field lines 713 that are affected by finger 717 can allow sense Vcom 703 to measure touch information. As shown in the figure, some of field lines 713 that reach sense Vcom 703 do not penetrate cover glass 715. These field lines may detect little if any touch information about finger 717.

Some of field lines 713 emitted from drive Vcom 701 can reach pixel electrode 705. Consequently, part of the drive signal that can be driving drive Vcom 701 can be picked up pixel electrode 705, and this signal can be passed to gate line 711 through drain 709. In particular, even though gate line 711 may be clamped to a fixed voltage, there can be a capacitance between drain 709 and gate line 711 that can allow a capacitive coupling of the portion of the drive signal captured by pixel electrode 705 into gate line 711. The field lines 713 that are captured by pixel electrode 705 can travel through a liquid crystal 719 of the touch screen 700. Similarly, a portion of the field lines 713 between drive Vcom 701 and sense Vcom 703 can also travel through a portion of liquid crystal 719.

In some displays, for example, in-plane switching (IPS), the dielectric constant of the liquid crystal 719 can vary depending on the pixel electrode-to-drive Vcom voltage applied to the display pixel. In some embodiments, the dielectric constant of liquid crystal 719 can change dramatically (e.g., ranging from 3 to 10) in a direction parallel to cover glass 715 along the y-direction as indicated by the arrow in FIG. 7. The pixel electrode-to-drive Vcom voltage can be applied at different voltage values by the display system in order to set the luminance of each display pixel in proportion to the voltage value. In other words, the dielectric constants of the liquid crystal in the display pixels through which the field lines 713 travel can vary, particularly at the location where the field lines are approximately collinear with the y-direction as shown in the figure.

Although FIG. 7 illustrates a single drive Vcom 701 and a single sense Vcom 703, these Vcoms can in fact be connected together Vcoms of a particular drive region and sense region such as the regions shown in FIGS. 4 and 5. Therefore, although not shown in the figures, the field lines may pass through many display pixel with different luminances associated with each.

Figure 8:
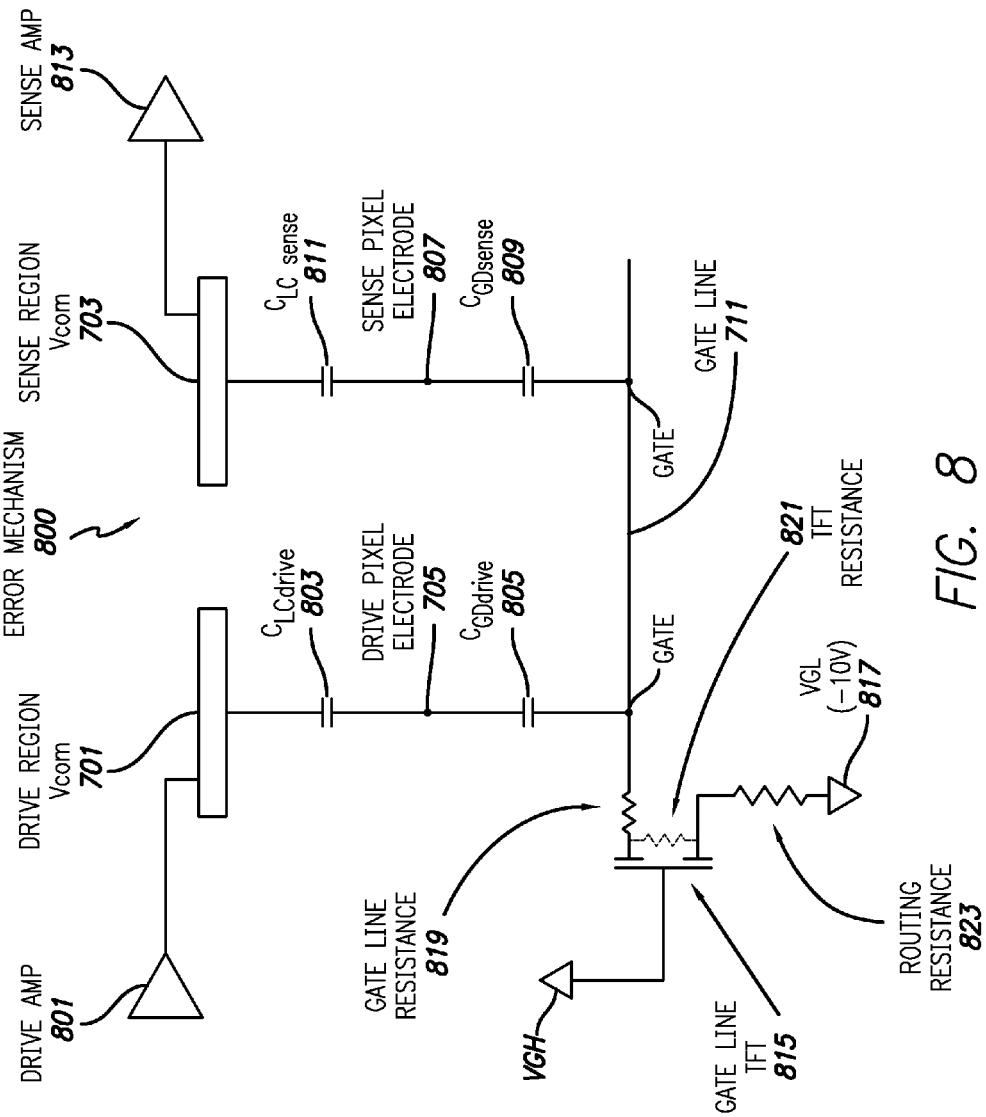
FIG. 8 illustrates a model of an example error mechanism in an example touch screen according to embodiments of the disclosure.
Figure 9:
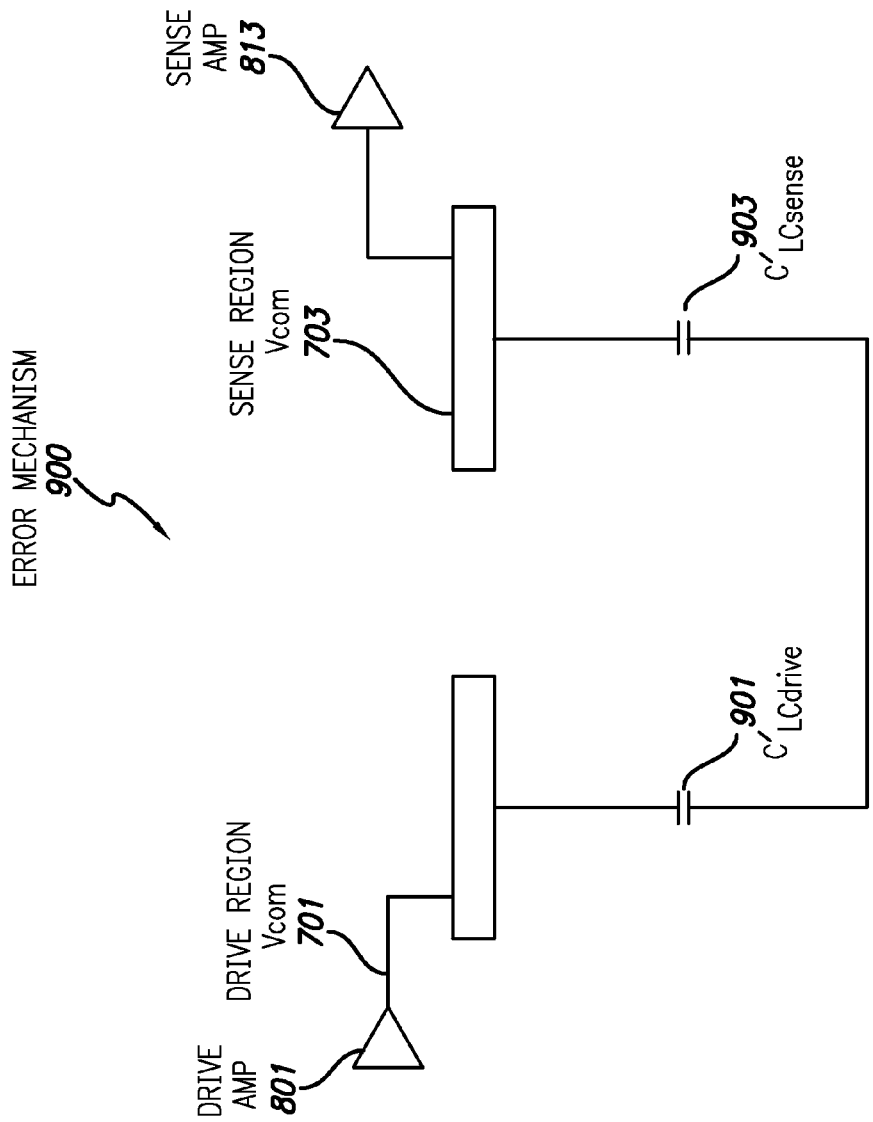
FIG. 9 illustrates a model of another example error mechanism in an example touch screen according to embodiments of the disclosure.

FIGS. 8 and 9 illustrate two different error mechanisms 800 and 900 of the example portion of touch screen 700 in FIG. 7. FIG. 8 illustrates an example circuit diagram of a model of a first error mechanism. A drive amplifier 801 can drive the drive region Vcom 701 with a drive signal as described above. A portion of the drive signal can be captured by pixel electrode 705 through field lines passing through liquid crystal 719. Liquid crystal 719 of display pixels in the drive region can have a capacitance, CLC drive 803. Once captured by pixel electrode 705, the signal can be passed to gate line 711 through a capacitance between drain 709 and gate line 711, CGD drive 805. Gate line 711 can be shared with the display pixels of the sense region, therefore the signal may be leaked into the display pixels of the sense region through a similar mechanism shown in the figure. In particular, the signal can pass into sense pixel electrode 807 through a gate-to-drain capacitance CGD sense 809 of the TFTs in the display pixels of the sense region. The signal can then be passed from pixel electrode 807 to sense region Vcom 703 through the liquid crystal 719 of the sense region display pixels, the liquid crystal having an associated capacitance CLC sense 811. The leaked signal can show up in the touch measurements detected by sense amplifier 813.

During the touch phase, in order to help reduce the above-described leakage, gate line 711 can be clamped to a VGL voltage 817 through a gate line TFT 815. Ideally, if gate line 711 could be perfectly clamped to a fixed voltage such as VGL 817, then no leakage could occur between drive region Vcom 701 and sense region Vcom 703. However, various resistances associated with gate line 711 can prevent the gate line from being perfectly clamped, that is, can allow leakage of the drive signal from the drive region to the sense region. For example, gate line 711 can have a gate line resistance 819 that may be spread throughout the gate line, although in FIG. 8, it is shown in one location. Gate line TFT 815 can have an associated TFT resistance 821. Also, a routing resistance 823 can be associated with the conductive lines used to route the gate line TFT 815 to VGL 817.

In the example error mechanism shown in FIG. 8, error in the sense signal can be introduced through various sources. One error source that can be introduced into the touch sensing signal through the error mechanism shown in FIG. 8 is the drive signal generated by drive amplifier 801. Another error source can be CLC drive 803 and CLC sense 811, which can change depending on the pixel luminances of the display pixels through which the field lines 713 pass between drive Vcom 701 and pixel electrode 705, and the field lines which travel from sense Vcom 703 to a corresponding pixel electrode in the sense region, respectively, as described above. In other words, the amount of the drive signal that can be leaked in this error mechanism can be dependent on the average pixel luminance associated with the drive region and sense region display pixels. Because the display pixel luminances depend on the image being displayed, the error introduced through this error mechanism can be said to be image-dependent.

Another error source that can introduce an error using this error mechanism can be associated with the gate-to-drain capacitances, CGD drive 805 and CGD sense 809, of the drive and sense region TFTs. In particular, the gate-to-drain capacitances can be affected by factors such as temperature, ambient light, etc. For example, a local temperature variance may cause the gate-to-drain capacitances of the local pixels to be different than other areas of the touch screen, and consequently the amount of drive signal in those local areas may be different than in the rest of the touch screen. In another example, gate-to-drain capacitance can depend on the currently displayed image, because the displayed image can change the voltage on the pixel electrode, so that the gate-to-drain voltage (VGD) can vary depending on image. In some embodiments that utilize, for example, diodes and/or transistors, CGD can depend strongly on the VGD. For example, the CGD can be high for low values of VGD, and the CGD can be low for high values of VGD.

The error mechanism shown in FIG. 8 can allow a portion of a drive signal from drive amplifier 801 to be leaked into the sense amplifier 813 in dependence on a number of variable error sources, such as the average luminance of associated display pixels in the drive and sense regions, and average local temperature of the display pixel TFTs, which can cause the gate-to-drain capacitances of display pixels in the drive and sense regions to vary, etc. Other elements of the circuit diagram can play a role in contributing to the error, such as the various resistances associated with gate line 711, as described above. These sources, or causes, of the error may be fixed, i.e., not variable, over time, location within the touch screen, etc. In other cases, the values of, for example, the various gate line resistances could be variable, for example, depending on location within the touch screen due to manufacturing inconsistencies. In the same way, other elements or structures within the touch screen may vary non-uniformly due to manufacturing errors. These differences among display pixels in different locations of the touch screen can contribute different amounts to the error mechanisms associated with the corresponding pixels. Thus, various error sources that can introduce error through a given error mechanism can be, for example, static error sources, dynamic error sources in time, position on the touch screen, an amount of the area of the touch screen, strength of the given error source, etc. The error sources might be, for example, known error sources or unknown error sources. Likewise, the specific error mechanism may be known or unknown.

Referring to FIGS. 7 and 9, another example error mechanism according to embodiments of the disclosure will now be described. As mentioned above with regard to FIG. 7, field lines 713 from drive Vcom 701 that are received by sense Vcom 703 travel through liquid crystal 719. Because the dielectric constant of liquid crystal 719 can change in the drive region display pixels and the sense region display pixels, based on the luminance of the pixels, the capacitance between drive Vcom 701 and sense Vcom 703 can change depending on the average luminance of the display pixels. FIG. 9 illustrates an example error mechanism related to the change in the liquid crystal capacitance between the drive and sense regions. FIG. 9 illustrates drive region Vcom 701 driven by drive amplifier 801 and sense region Vcom 703 which can output a sense signal to sense amplifier 803 for measurement of touch. Also illustrated in the figure are a liquid crystal capacitance of the drive and sense regions, C'LC drive 901 and C'LC sense 903, respectively. The example error mechanism shown in FIG. 5 can be the same mechanism by which touch is sensed. In other words, the path taken by the drive signals to reach the sense amplifier can be the path of the field lines that are used to sense touch.

In this example, the source of the error that can introduce an error into the sense signal can be the variable dielectric constant associated with the liquid crystal, which in turn can produce a varying capacitance in the touch-sensing mechanism or signal pathway. In this example, the capacitances associated with the drive region and the sense region can be different than the capacitances in the example error mechanism shown in FIG. 8 because the path taken by the field lines in each example error mechanism can be different. For example, referring to FIG. 7, the field lines through the liquid crystal in the FIG. 8 error mechanism are seen on the left side of the drive Vcom extending to the pixel electrode and correspondingly on the sense region side, not shown in the figure, field lines extending from sense Vcom 703 to corresponding pixel electrode. Turning to the example of FIG. 9, however, the relevant field lines through the liquid crystal 719 are shown extending from the right side of drive Vcom 701 to the left side of sense Vcom 703. Therefore, in FIG. 9, the values CLC drive and CLC sense are given prime superscripts.

In the example error mechanism of FIG. 9, it is noted that the only source of error is the pixel luminance. In addition, it is noted that the relevant pixels can be different than the relevant pixels in the example of FIG. 8, because of the different paths taken by the relevant field lines 713. Of course, there may be other elements in the error mechanism/touch-sensing mechanism shown in FIG. 9, such as, for example, the cover glass, other elements of the display, etc. It is also noted that some field lines can travel through all of the relevant structures of the touch screen, for example, the field lines extending beyond the cover glass 715. On the other hand, some field lines 713 extend through only some of the structures. For example, some field lines do not reach the cover glass and may only travel through liquid crystal 719. In that regard, it is further noted that some field lines may travel through more liquid crystal than other field lines, some field lines may have larger portions that are parallel or collinear with axis Y (in which case, those field lines may be more affected by the changing dielectric constant than field lines that have less of a portion collinear with axis Y).

Figure 10:
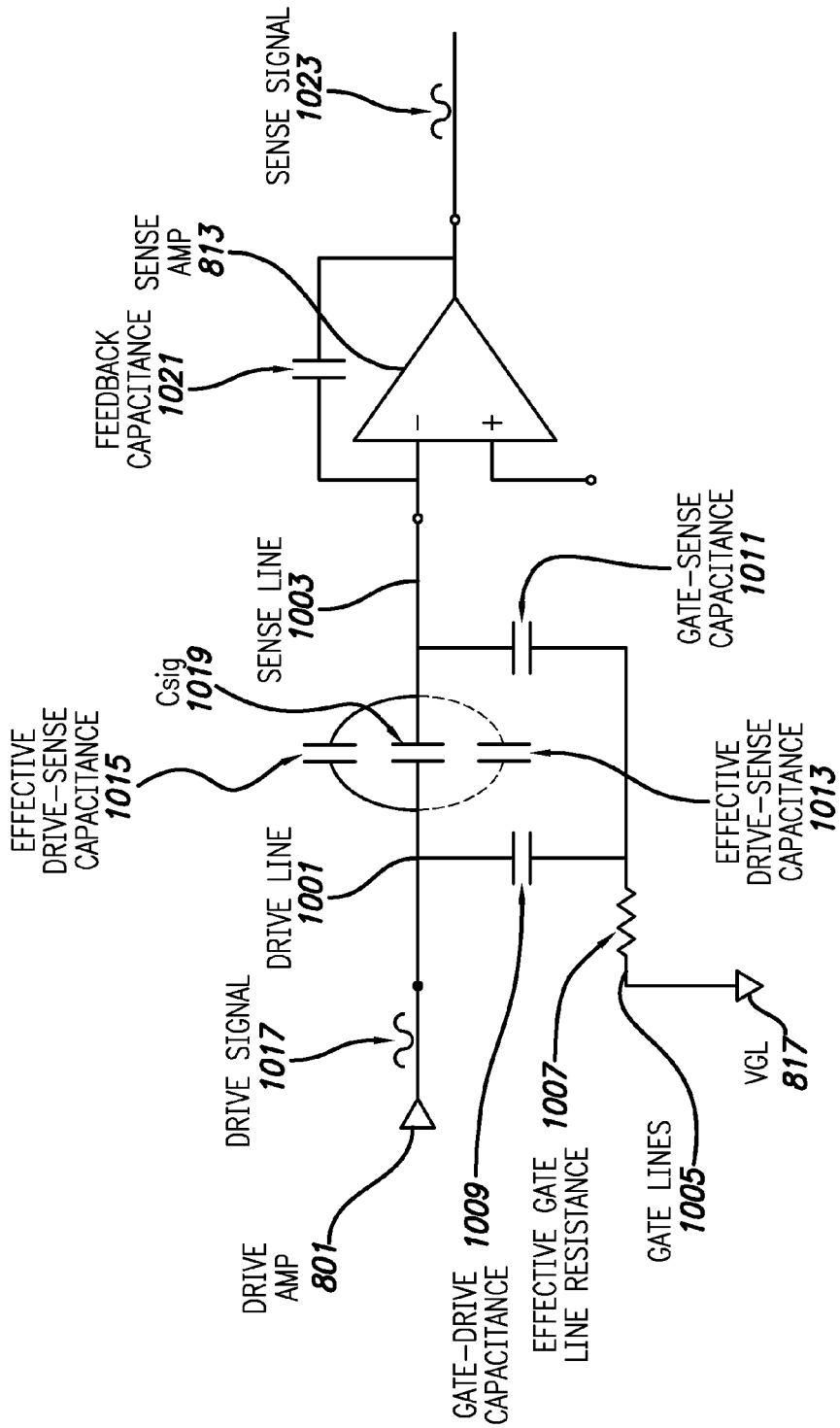
FIG. 10 illustrates a circuit diagram of a drive-sense operation of an example touch screen according to embodiments of the disclosure.

FIG. 10 illustrates an example circuit diagram of the example touch screen configuration 700 shown in FIG. 7. FIG. 10 includes the example error mechanisms 800 and 900 of FIGS. 8 and 9. In the previous examples of FIGS. 7 through 9, for the sake of clarity, only one drive Vcom/sense Vcom pair were described. However, as shown in the example embodiments described in FIGS. 4 through 6, the drive lines and sense lines of an integrated touch screen can include the Vcoms of multiple display pixels grouped together in a region of the touch screen. In the example circuit diagram of FIG. 10, a drive line 1001 can include drive region segments such as drive region segment 403 linked together with bypasses as described in FIGS. 3 and 5, and a sense line 1003 can include a sense region such as sense region 405 including a sense region such as sense region 405, including electrically connected together Vcoms of display pixels in the sense region as described in the figures. Gate lines 1005 can include multiple gate lines such as gate lines 711 running through multiple rows of display pixels in the drive line 1001 and portion of the sense line 1003. For example, there may be 60 gate lines 1005 in each drive line 1001. An effective gate line resistance 1007 can include a combination of resistances associated with the multiple gate lines 1005, such as gate line resistance 819, TFT resistance 821, and routing resistance 823 of each of the 60 gate lines, for example. Likewise, a gate-drive capacitance 1009 can include a combination of various capacitances between the multiple drive Vcom 701 and each corresponding gate line 1005. For example, gate-drive capacitance 1009 can include a combination of the CLC drive 803 and CGD drive 805 of each display pixel in the drive region. Likewise, a gate-sense capacitance 1011 can include a combination of the CLC sense 811 and CGD sense 809 of all of the display pixels in the sense region. Effective drive-sense capacitance 1013 can, therefore, represent the total effective capacitance between the drive and sense regions due to the various capacitances associated with each of the display pixels in the regions.

An effective drive-sense capacitance 1015 can include a combination of C'LC drive 901 and C'LC sense 903 of all of the display pixels in the corresponding drive regions and sense regions. Drive amplifier 801 can generate a drive signal 1017 on drive line 1001 that can emanate from the multiple drive Vcoms in the drive region through the various error mechanisms of error mechanism 800, represented by effective drive-sense capacitance 1013, and error mechanism 900, represented by effective drive-sense capacitance 1015, as well as through touch-sensing mechanism to generate a signal capacitance, CSIG, which can represent touch information which is received by sense line 1003 and amplified by sense amplifier 813, which can include a feedback capacitance 1021 to result in a sense signal 1023. Therefore, sense signal 1023 can be a superposition of multiple CSIG signals 1019, carrying touch information, together with multiple signals due to error mechanisms 800 and 900.

Figure 11:
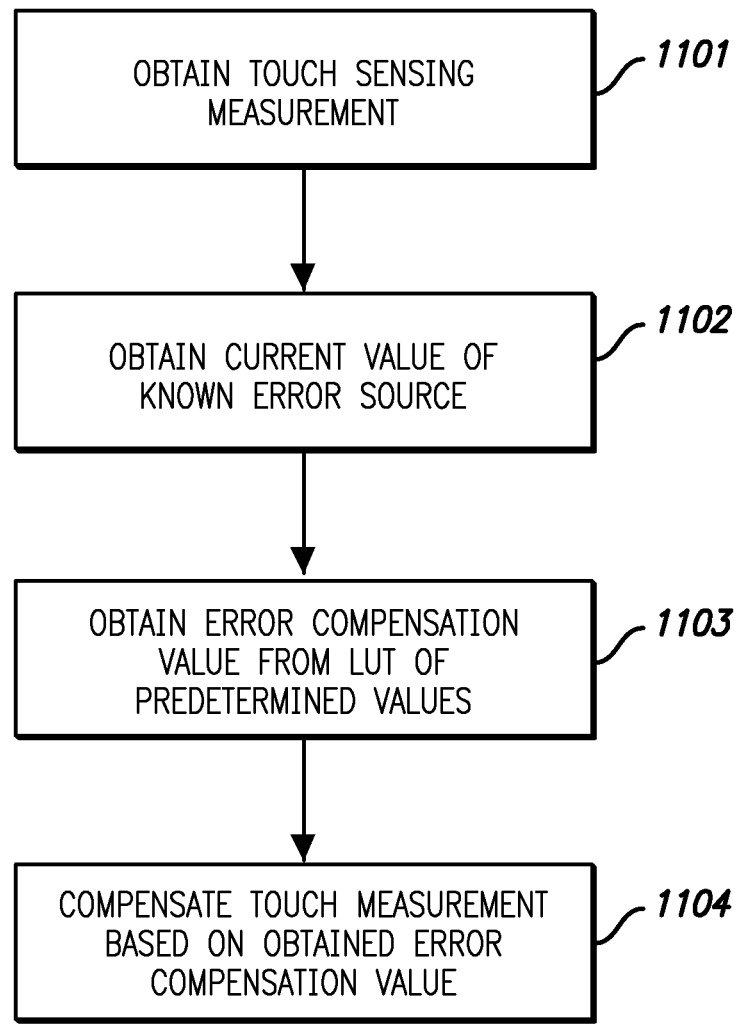
FIG. 11 illustrates a flowchart of an example method of compensating for error using predetermined error compensation values in touch measurement according to embodiments of the disclosure.

Referring now to FIGS. 10 and 11, and example method of compensating for error in touch measurements, will now be described according to an example embodiment of the disclosure. In the example error mechanisms of FIG. 10, namely, error mechanism 800 and error mechanism 900, certain error sources were the cause of error introduced by way of the error mechanisms. If one or more error sources are known, the error associated with the error source can be measured together with a value of the error source, for example, in a factory setting during a calibration phase. In other words, if it is known that a certain measurable or known characteristic of the touch screen will cause an error, then that characteristic can be measured under controlled circumstances, for example, using test equipment, and at the same time an error produced in the touch-sense signal can be measured. By measuring a range of error source values, together with corresponding error result values, an understanding of the relationship between the error source and the error produced can be developed. For example, in one example, the measurements taken during the calibration phase at the factory can be stored in a computer-readable medium in the device, for example, in a lookup table (LUT), and the device can access the values to make compensation adjustments for touch-sense measurements if a corresponding value of the source error is known at the time of the touch measurement. In some embodiments, the relationship between source error and the resulting error can be summarized as a mathematical function and stored in a computer-readable medium for the device to use during compensation. Once the relationship between the source of the error and the error produced is stored on a device, such as a touch screen, the method according to FIG. 11 may be used during the operation of the device by a user.

Referring to FIG. 11, during a touch phase of the device, touch-sensing measurements can be obtained (1101), and values of the known error source at the time of the touch-sensing measurement can be obtained (1102). Referring again to the previous examples in FIGS. 7 through 10, various error sources could include average display pixel luminance, localized temperature, etc. Error sources that are unknown at the time of calibration may not be able to be adjusted for, for example, because no test or calibration can be performed by varying an unknown value to obtain the relationship between the unknown value and the error produced. However, the method according to FIG. 11 may have the advantage that the particular error mechanism through which the error source introduces error into the touch measurement need not be known. In other words, for example, if it is known that average luminance of display pixels of a touch pixel can have an effect on the measurements of touch, empirical testing can be performed to determine the relationship, and further to store the relationship for later use during compensation of the touch measurements. Of course, one skilled in the art would readily understand after reading the disclosure that other methods such as interpolation of data in a LUT and other methods of storing and using relationship data can be used in various embodiments.

Turning again to FIG. 11, error compensation values can be obtained (1103) from the LUT of predetermined values based on the known value of the error source at the time of touch measurement. The touch-sensing measurements and the corresponding error compensation values can be sent to an error compensator, such as error compensator 250 in FIG. 2, where the obtained error compensation value can be used to compensate the touch measurement, the obtained compensation value being reflective of the relationship between the error source and the produced error at that value.

Another example method of error compensation according to various embodiments of the disclosure will now be described with reference to FIGS. 12 through 18.

Figure 12:
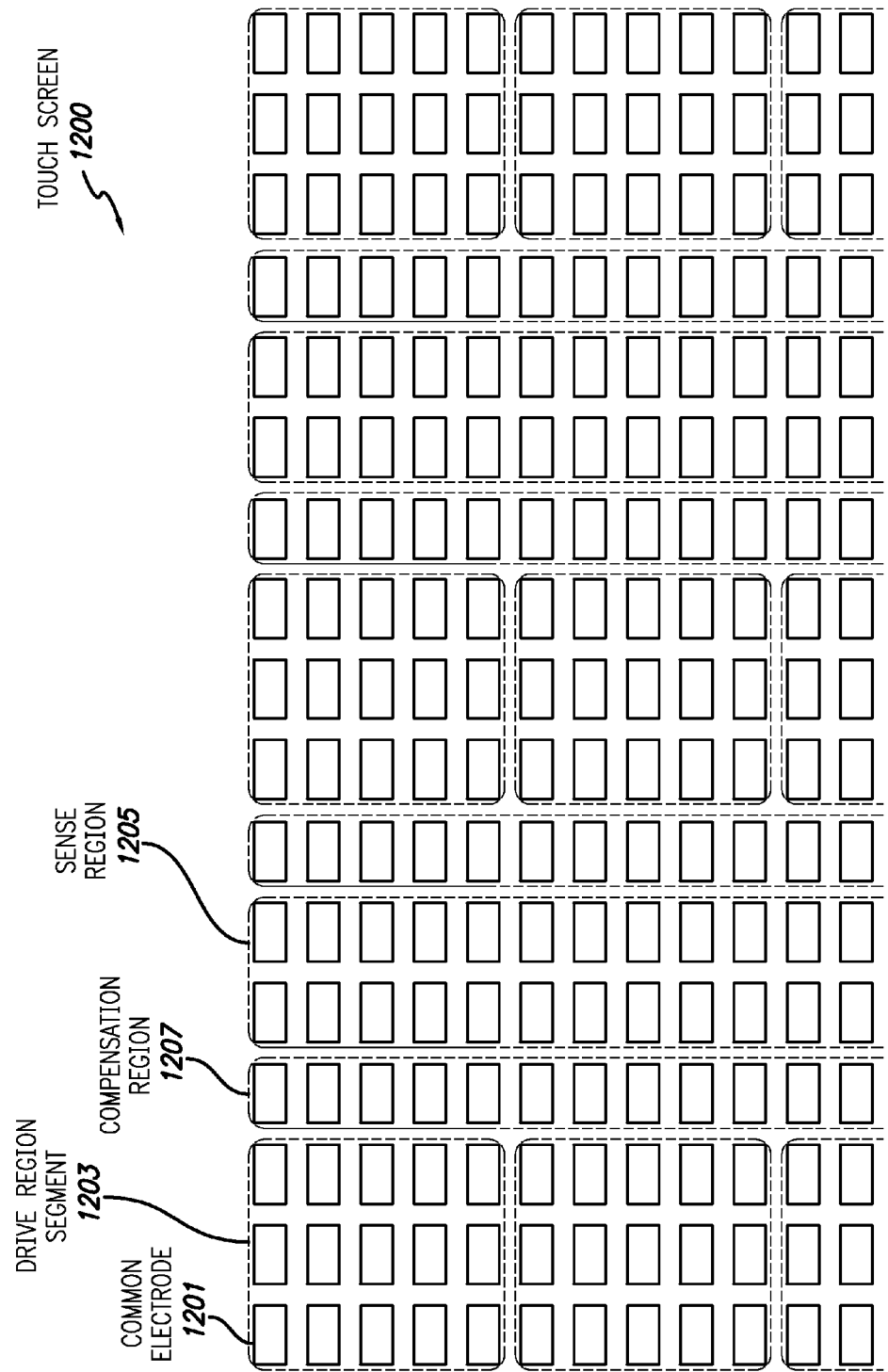
FIG. 12 illustrates a portion of an example touch screen including compensation regions according to embodiments of the disclosure.

FIG. 12 illustrates a touch screen 1200 according to various embodiments of the disclosure. A portion of touch screen 1200 illustrated in FIG. 12 shows multiple display pixels and that can each include a common electrode 1201. Other structures of the display pixels are not shown, for the sake of clarity. Various groupings of common electrodes 1201 can be formed by, for example, connection elements such as the connection elements shown in FIG. 5. The groupings can include drive region segments 1203, sense regions 1205 and compensation regions 1207. As shown in the example embodiment of FIG. 12, compensation regions 1207 are positioned between adjacent drive region segments 1203 and sense regions 1205.

Figure 13:
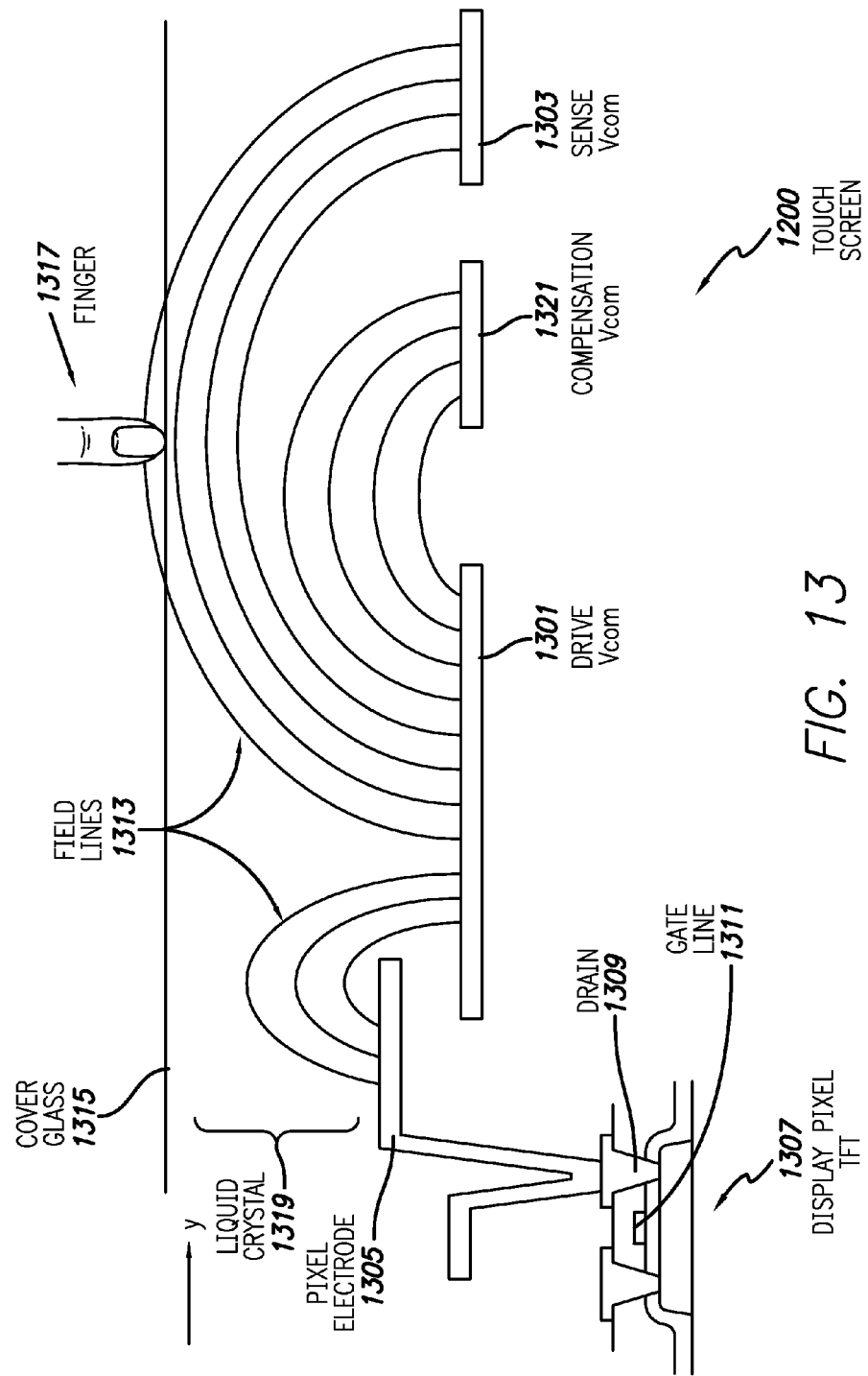
FIG. 13 illustrates a portion of an example touch screen during a touch sensing phase according to embodiments of the disclosure.

FIG. 13 illustrates an example operation of touch-sensing during a touch-sensing phase of touch screen 1200. Similar to the structure shown in the example of FIG. 7, touch screen 1200 includes a drive Vcom 1301, a sense Vcom 1303, and a pixel electrode 1305. The pixel electrode 1305 is connected to a display pixel TFT 1307 through a drain 1309. Display pixel TFT 1307 includes a gate line 1311, which is a common gate line to the sense Vcom 1303 (although not shown in the figure). When driven by a drive signal, drive Vcom 1301 emits field lines 1313. Some of the field lines 1313 exit a cover glass 1315 and reach a finger 1317. The field lines 1313 that are affected by finger 1317 allow sense Vcom 1303 to measure touch information.

Some of field lines 1313 emitted from drive Vcom 1301 can reach pixel electrode 1305. In this way, similar to the example embodiment in FIG. 7, part of the drive signal that is driving Vcom 1301 can be picked up by pixel electrode 1305, and this signal can be passed to gate line 1311 through drain 1309. In particular, even though gate line 1311 may be clamped to a fixed voltage, there can be a capacitance between drain 1309 and gate line 1311 that allows a capacitive coupling of the portion of the drive signal captured by pixel electrode 1305 into gate line 1311. The field lines 1313 that are captured by pixel electrode 1305 can travel through a liquid crystal 1319 of touch screen 1200. Similarly, a portion of field lines 1313 between drive Vcom 1301 and sense Vcom 1303 can also travel through a portion of liquid crystal 1319.

Unlike the example embodiment shown in FIG. 7, touch screen 1200 includes a compensation Vcom 1321. As shown in FIG. 12, compensation Vcom 1321 can be in a compensation region 1207 positioned between a drive region segment 1203 and a sense region 1205. Some of the field lines 1313 from drive Vcom 1301 are captured by compensation Vcom 1321. In this example embodiment, compensation Vcom 1321 was designed to capture field lines 1313 that have not penetrated to the outside of cover glass 1315. In this way, for example, the amount of touch detected by compensation Vcom 1321 can be reduced or minimized, and in some embodiments may be negligible. In contrast, most of the field lines 1313 from drive Vcom 1301 to sense Vcom 1303 can extend to the outside of cover glass 1315, therefore, the amount of touch detected by sense Vcom 1303 can remain similar to the amount of touch detected in the example embodiment shown in FIG. 7.

Figure 14:
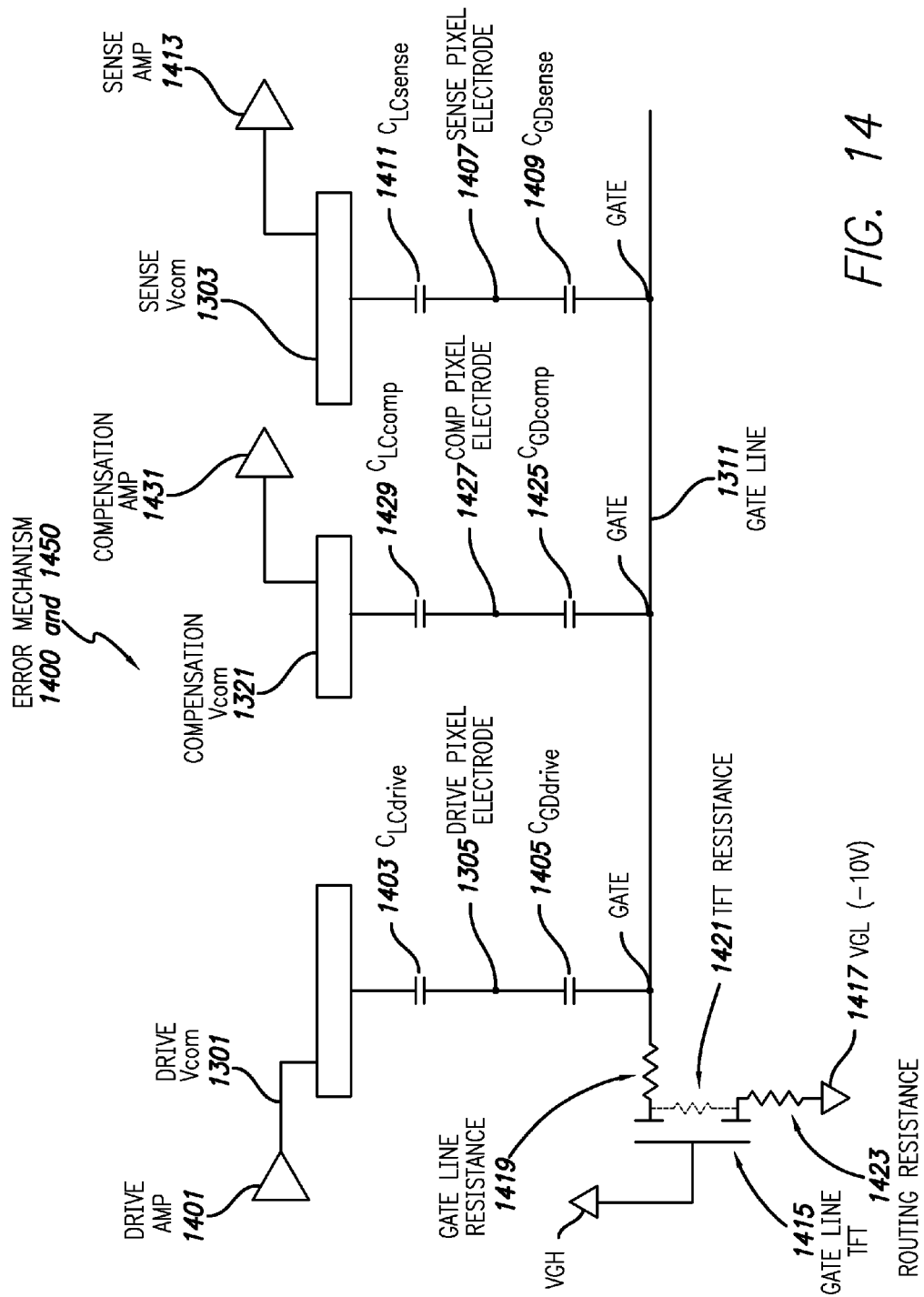
FIG. 14 illustrates example error mechanisms in an example touch screen according to embodiments of the disclosure.
Figure 15:
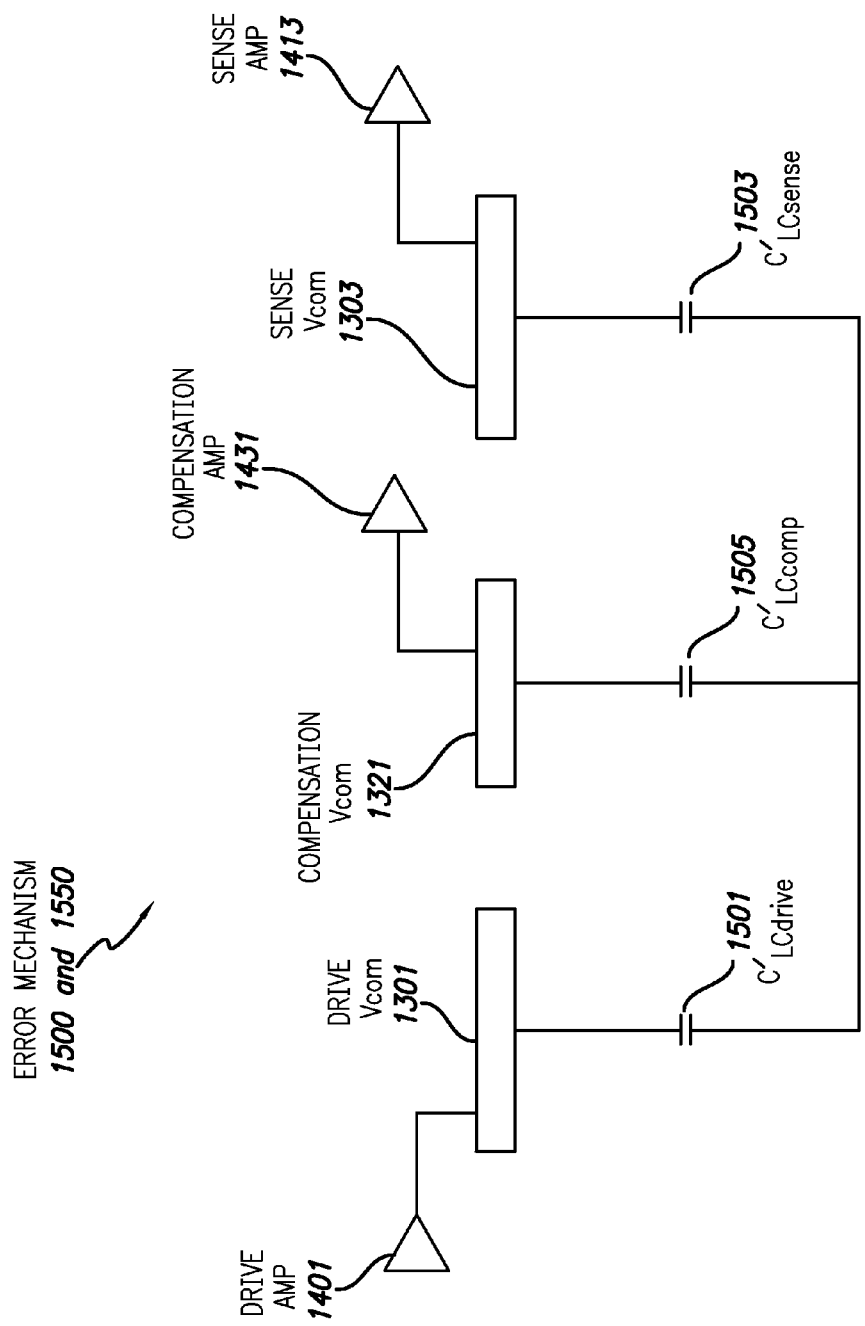
FIG. 15 illustrates other example error mechanisms in an example touch screen according to embodiments of the disclosure.

In sum, compensation Vcom 1321 can be selected to detect little to no amount of touch information, while at the same time compensation Vcom can be positioned in such a way that it can be coupled to the same error mechanisms that introduce errors into the sense measurements of sense Vcom 1303. FIGS. 14 and 15 illustrate more details of example error mechanisms that can occur in the example embodiment of FIG. 13.

FIG. 14 illustrates a model of example error mechanisms 1400 and 1450 of touch screen 1200 according to embodiments of the disclosure. As described in more detail below, error mechanism 1400 can include the electrically coupled path between drive Vcom 1301 and sense Vcom 1303. Similar to error mechanism 800 of FIG. 8, a drive amplifier 1401 drives drive region Vcom 1301 with a drive signal as described above. A portion of the drive signal can be captured by pixel electrode 1305 with field lines passing through liquid crystal 1319. Liquid crystal 1319 has a capacitance, CLC drive 1403, and once captured by pixel electrode 1305, the signal can be passed to gate line 1311 through a capacitance between drain 1309 and gate line 1311, CGD drive 1405. Gate line 1311 is shared with the display pixels of the sense region, therefore the signal may be leaked into the display pixels of the sense region through a similar mechanism shown in the figure. In particular, the signal can pass into sense pixel electrode 1407 through a gate-to-drain capacitance CGD sense 1409 of the TFTs in the display pixels of the sense region. The signal can then be passed from pixel electrode 1407 to sense region Vcom 1303 through the liquid crystal 1319 of the sense region display pixels, the liquid crystal having an associated capacitance CLC sense 1411. The leaked signal can show up in the touch measurements detected by sense amplifier 1413.

During the touch phase when the above-described leakage can occur, gate line 1311 can be clamped to a VGL voltage 1417 through a gate line TFT 1415. As described above with regard to FIG. 8, if gate line 1311 could be perfectly clamped to a fixed voltage such as VGL 1417, then no leakage could occur between drive region Vcom 1301 and sense region Vcom 1303. However, various resistances associated with gate line 1311 can prevent the gate line from being perfectly clamped, that is, can allow leakage of the drive signal from the drive region to the sense region. For example, gate line 1311 can have a gate line resistance 1419 that may be spread throughout the gate line, although in FIG. 14, it is shown in one location. Gate line TFT 1415 can have an associated TFT resistance 1421. Also, a routing resistance 1423 can be associated with the conductive lines used to route the gate line TFT 1415 to VGL 1417.

Similar to the example embodiment of FIG. 8, in the example error mechanism shown in FIG. 14, error in the sense signal can be introduced through various sources, such as through variance of pixel luminance, temperature of the touch screen, etc.

Error mechanism 1450 can include the electrically coupled path between drive Vcom 1301 and compensation Vcom 1321. Error mechanism 1450 can include the same and/or similar elements as error mechanism 1400. For example, error mechanism 1450 can include drive Vcom 1301, CLCdrive 1403, drive pixel electrode 1305, and CGDdrive 1405, which are some of the same elements of error mechanism 1400. Error mechanism 1450 can also include a gate-to-drain capacitance, CGDcomp 1425, a compensation region pixel electrode 1427, a liquid crystal capacitance, CLCcomp 1429, and compensation Vcom 1321. Because of the configuration of the compensation 1207, CGDcomp 1425 can be similarly affected by error sources, such as local temperature, as CGDsense 1409, and CLCcomp 1429 can be similarly affected by error sources, such as pixel luminance, as CLCsense 1411. Therefore, error mechanism 1450 can provide a mechanism that reflects error mechanism 1400. During the touch phase, a compensation signal can be measured from compensation Vcom 1321 with a compensation amplifier 1431, for example.

Because error mechanisms 1400 and 1450 are similar, the compensation signal can include a similar error as the error introduced in the touch sensing signal. However, because the compensation region receives few, if any, field lines that extend outside of the cover glass, the compensation signal can include little, if any, touch information. Therefore, the compensation signal can provide a more direct indication of the error introduced into the touch sensing signal. Due to various factors, the amount of error measured by the compensation may not be the same as the amount of error introduced into the touch sensing signal, but the two amounts of error may be related by some relationship that can be determined. In some example embodiments, the relationship can be determined empirically. I some embodiments, the relationship can be determined by analyzing the circuits of each of the respective error mechanisms. Once the relationship between measured compensation error and measured touch sensing error is determined, the relationship can be stored in, for example, a computer-readable medium to be retrieved for an error compensation process, described in more detail below.

One potential advantage configuring a compensation sensor to be coupled to the same or similar error mechanism as the touch sensing region, for example, is that it can be possible to compensate for unknown error sources that introduce error into the touch sensing measurement by way of the error mechanism. In particular, because the compensation sensor can provide a real-time model of the drive-to-sense error mechanism, any error source that enters through the drive-to-sense error mechanism can also enter the drive-to-compensation error mechanism and be detected by the compensation sensor. In some embodiments, for example, unknown non-uniformities of the touch screen manufacture that cause error may be compensated without specific calibration directed to the error source, which may be impossible if the error source is unknown or, even if the error source is known, difficult to perform.

Referring to FIG. 15, other example error mechanisms according to embodiments of the disclosure will now be described. Similar to the example error mechanism 900, an example error mechanism 1500 of touch screen 1200 can result from field lines 1313 from drive Vcom 1301 that are received by sense Vcom 1303 extend primarily through liquid crystal 1319 in display pixels of the drive region and the sense region. Therefore, error mechanism 1500 can include drive Vcom 1301, liquid crystal capacitances of the drive region and sense region, C'LC drive 1501 and C'LC sense 1503, respectively, and sense Vcom 1303. As in the previous example, the example error mechanism shown in FIG. 15 is the same mechanism by which touch is sensed.

Error mechanism 1550 can be similar to error mechanism 1500, and can result from field lines 1313 extending through liquid crystal 1319 primarily in the drive region and compensation region. Therefore, error mechanism 1550 can include drive Vcom 1301, liquid crystal capacitances of the drive region and compensation region, C'LC drive 1501 and C'LC comp 1505, respectively, and compensation Vcom 1321. In some embodiments, some field lines of error mechanism 1500 may extend through liquid crystal of the compensation region, and the associated error mechanism may include an additional associated capacitance.

Similar to error mechanism 900, it is noted that the only source of error that introduces error through error mechanism 1550 may be the pixel luminance. In addition, it is noted that the relevant pixels can be different than the relevant pixels in the example of FIG. 14, because of the different paths taken by the relevant field lines 1313. Of course, there may be other elements in the error mechanism/touch-sensing mechanism shown in FIG. 15, such as, for example, the cover glass, other elements of the display, etc. It is also noted that some field lines can travel through all of the relevant structures of the touch screen, for example, the field lines extending beyond the cover glass 1315. On the other hand, some field lines 1313 extend through only some of the structures. For example, some field lines do not reach the cover glass and may only travel through liquid crystal 1319. In that regard, it is further noted that some field lines may travel through more liquid crystal than other field lines, some field lines may have larger portions that are parallel and collinear with axis Y (in which case, those field lines may be more affected by the changing dielectric constant than field lines that have less of a portion collinear with axis Y).

Figure 16:
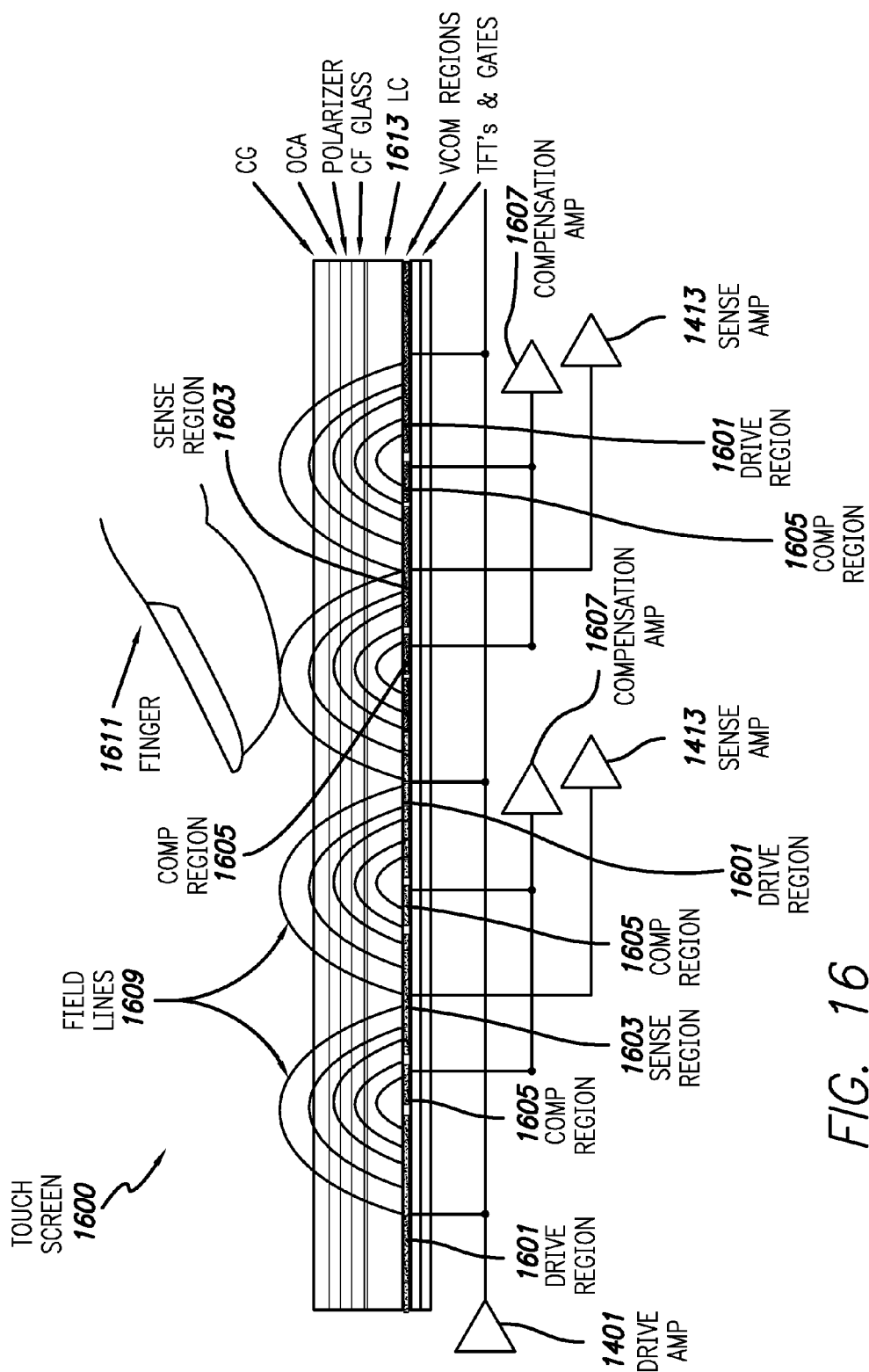
FIG. 16 illustrates an example touch screen configuration according to embodiments of the disclosure.

FIG. 16 illustrates an example configuration for measuring compensation signals according to embodiments of the disclosure. An example touch screen 1600 can include drive regions 1601 and sense regions 1603 with compensation regions 1605 positioned in between the drive and sense regions. Drive amplifier 1401 can provide a drive signal to the drive region and a sense amplifier can measure a sense signal through sense amplifier 1413. A single compensation amplifier 1607 can be connected to two compensation regions adjacent to the same sense region 1603, for each sense region of touch screen 1600. The electrical connections between the compensation regions and the compensation amplifiers can be included in, for example, sense interface 225 and the compensation amplifiers can be included in, for example, touch controller 206 alongside sense channels 208. In this regard, compensation signals can be processed by touch controller 206 in the same way as sense signals, e.g., including demodulation in some embodiments such as embodiments in which the drive regions are concurrently stimulated with drive signals, e.g., in a multi-stim drive scheme. In this way, for example, an amount of error reflected by the information in one or more compensation signals can be extracted from the one or more compensation signals in a similar way that an amount of touch (and an amount of error) can be extracted from one or more sense signals. Fields lines 1609 extending from the drive regions 1601 can be captured by the sense regions 1603 and the compensation regions 1605. Some field lines can be disturbed by a finger 1611, which can result in touch information being included in a sense signal. Other elements of touch screen 1600 are also illustrated, including liquid crystal 1613.

Connecting pairs of compensation regions around each sense region can provide compensation information that can be specific to each individual touch pixel, for example.

Figure 17:
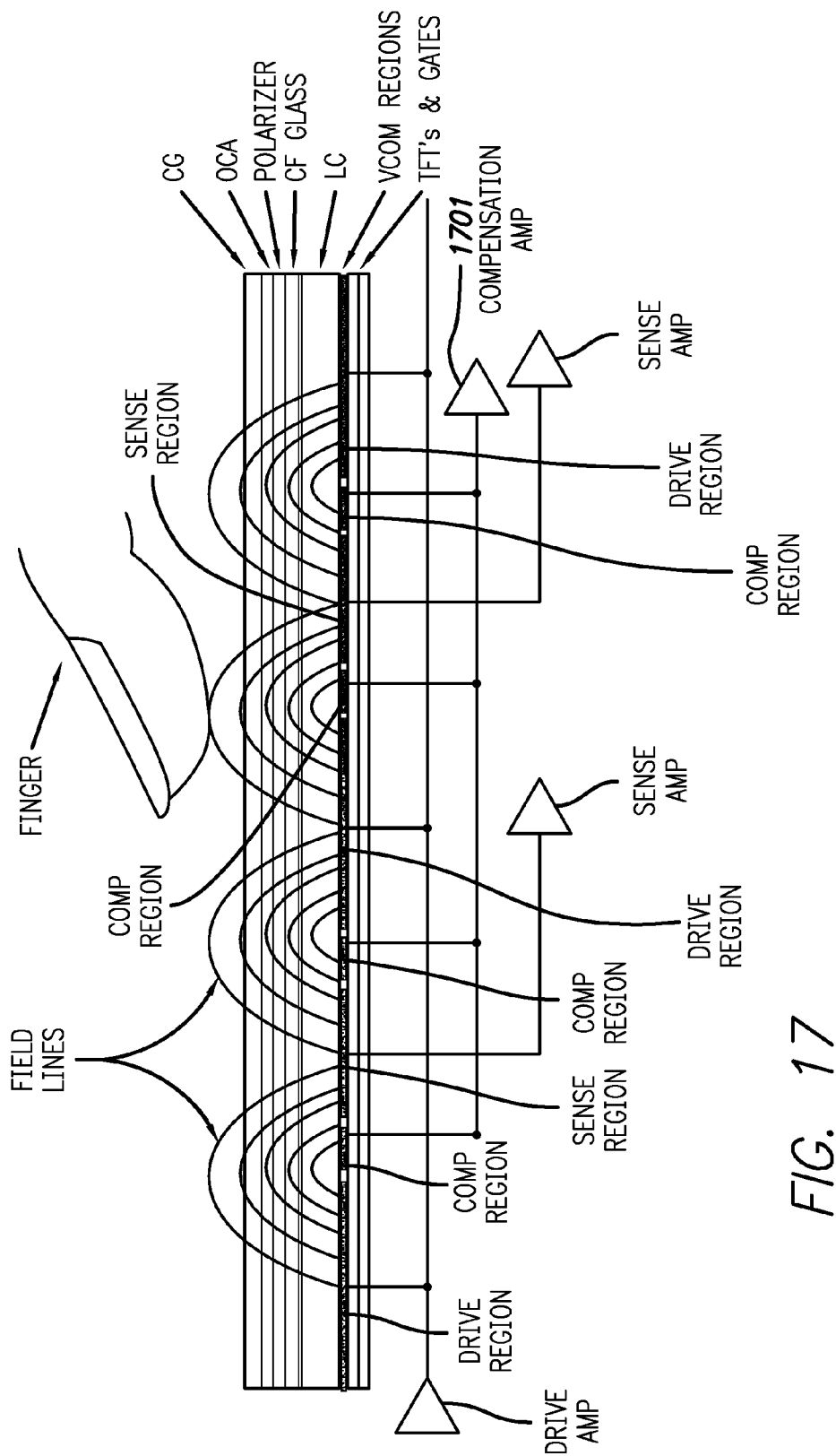
FIG. 17 illustrates another example touch screen configuration according to embodiments of the disclosure.

FIG. 17 illustrates another example configuration for measuring compensation signals according to embodiments of the disclosure. The configuration of FIG. 17 can be identical to FIG. 16 with the exception that each compensation amplifier 1701 is connected to more than two compensation regions. For example, each compensation amplifier can be connected to two pairs of compensation regions. In this example, the number of compensation amplifiers can be reduced.

Figure 18:
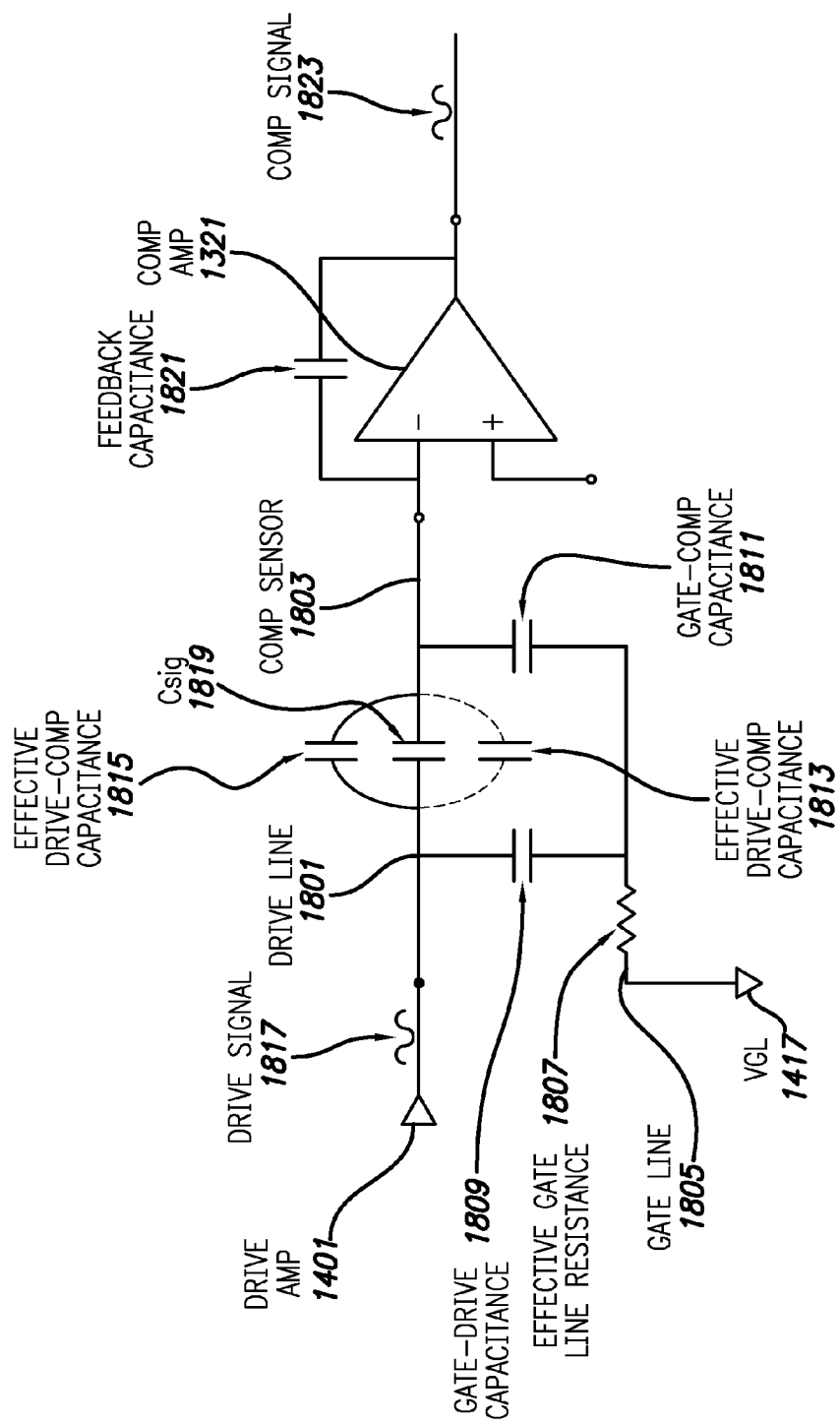
FIG. 18 illustrates a circuit diagram of a drive-sense operation of an example touch screen according to embodiments of the disclosure.

FIG. 18 illustrates an example circuit diagram including drive-to-compensation operation through error mechanisms 1450 and 1550, and including touch sensing, if any. In the previous examples of FIGS. 13 through 15, for the sake of clarity, only one drive Vcom/comp Vcom pair was described. In the example circuit diagram of FIG. 18, a drive line 1801 can include drive region segments such as drive region segment 403 linked together with bypasses as described in FIGS. 3 and 5, and a compensation sensor 1803 can include a compensation region such as compensation region 1207, including electrically connected together Vcoms of display pixels in the compensation region as described in the figures. As described in FIGS. 16 and 17, compensation sensor 1803 can include multiple compensation regions, such as a pair, two pairs, all compensation regions, etc. Gate lines 1805 can include multiple gate lines such as gate lines 1311 running through multiple rows of display pixels in the drive line 1801 and portion of the sense line 1803. For example, there may be 60 gate lines 1805 in each drive line 1801. An effective gate line resistance 1807 can include a combination of resistances associated with the multiple gate lines 1805, such as gate line resistance 1419, TFT resistance 1421, and routing resistance 1423 of each of the 60 gate lines, for example Likewise, a gate-drive capacitance 1809 can include a combination of various capacitances between the multiple drive Vcom 701 and each corresponding gate line 1805. For example, gate-drive capacitance 1809 can include a combination of the CLC drive 1403 and CGD drive 1405 of each display pixel in the drive region. Likewise, a gate-comp capacitance 1811 can include a combination of the CLC comp 1429 and CGD comp 1425 of all of the display pixels in the compensation region. Effective drive-comp capacitance 1813 can, therefore, represent the total effective capacitance between the drive and compensation regions due to the various capacitances associated with each of the display pixels in the regions.

An effective drive-sense capacitance 1815 can include a combination of C'LC drive 901 and C'LC comp 1503 of all of the display pixels in the corresponding drive regions and compensation regions. Drive amplifier 1401 can generate a drive signal 1817 on drive line 1801 that can emanate from the multiple drive Vcoms in the drive region through the various error mechanisms of error mechanism 1450, represented by effective drive-comp capacitance 1813, and error mechanism 1550, represented by effective drive-comp capacitance 1815, as well as through touch-sensing mechanism to generate a signal capacitance, CSIG 1819, which represents touch information which is received by compensation sensor 1803 and amplified by compensation amplifier 1321, which can include a feedback capacitance 1821 to result in a compensation signal 1823. Therefore, compensation signal 1823 can be a superposition of multiple signals due to error mechanisms 1450 and 1550, and may also carry some touch information due to a small amount of CSIG signals 1819, though as a result of the design of compensation sensor 1803, the amount of touch information measured should be proportionately less than the sense region.

The drive-to-sense interaction in example embodiments of touch screens including error mechanisms 1400 and 1500 can be similarly represented by the example circuit diagram shown in FIG. 10, although one skilled in the art would readily understand that the actual values of the elements of the circuit would be different due to the differences in the configurations of touch screens 700 and 1200. In short, the sense signal output by sense amplifier 1413 can include a superposition of a touch sensing signal carrying touch information based on measured Csig signals and error introduced through error mechanisms 1400 and 1500 by various known and/or unknown error sources.

Figure 19:
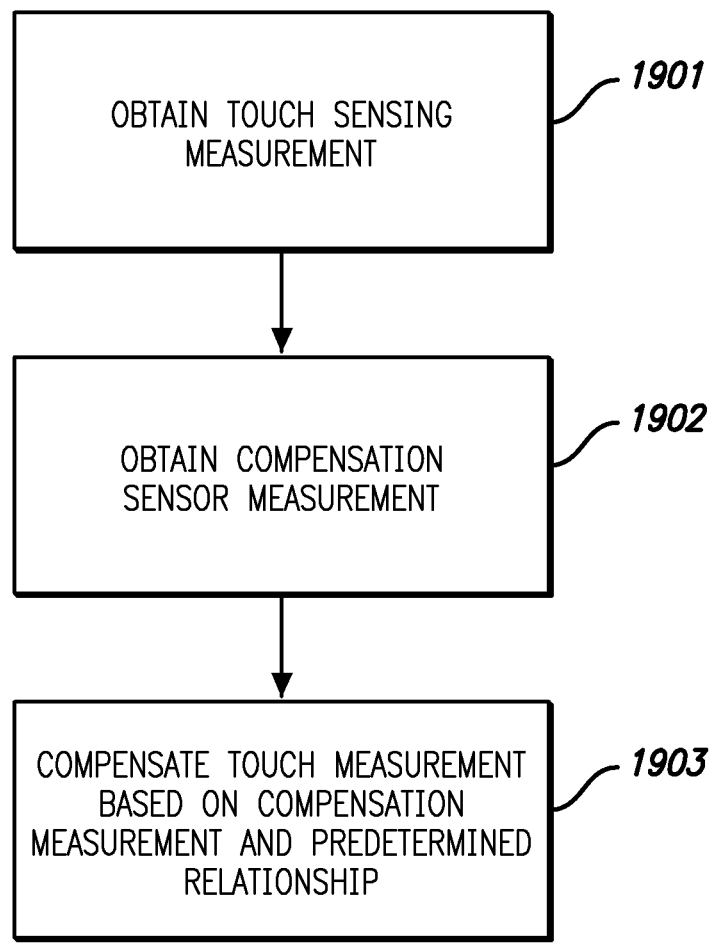
FIG. 19 illustrates a flowchart of an example method of compensating for error in touch measurement using compensation sensors according to embodiments of the disclosure.

FIG. 19 illustrates a flowchart of an example method of compensating for error in touch sense signals with compensation signals measured by compensation sensors such as the example compensation sensors described above. A touch sensing measurement can be obtained (1901), and a compensation sensor measurement can be obtained (1902). The touch sensing measurement and the compensation sensor measurement can be sent to an error compensator, such as, for example, error compensator 250 in FIG. 2, where the touch sensing measurement can be compensated (1903) based on the compensation measurement and a predetermined relationship, which can be predetermined empirically, for example, as described above. In some embodiments, the relationship can be defined by the following function: $A-K*B$, where A can be the amount of the sense signal measurement, B can be the amount of compensation signal measurement, and K can be a scalar. In some embodiments, the value of K can be determined empirically and stored in a computer-readable medium of the touch screen. In some embodiments, the value of K can be determined by analyzing the touch sensing and compensation systems through circuit analysis to determine K mathematically. In some embodiments, K can vary, for example, based on other system operational parameters, such as drive signal frequency. In this case, multiple values of K can be stored and the particular value of K that corresponds to the current operational parameters can be retrieved for error compensation calculations. In one approximation, the value of K can be set to equal the ratio of area of the touch sensing region to the compensation region.

In some embodiments, error compensation can be done after a demodulation process to extract information from the sense signals and from the compensation signals. For example, as a result of the demod, one or more sense signals can be processed into extract a sense value that can include an amount of touch measured and an amount of error. Likewise, an amount of error (and in some embodiments, an amount of touch) can be extracted from one or more compensation signals for use in the error compensation process. In embodiments in which the compensation sensor detects some amount of touch, the ratio of the amount of touch to the amount of error detected by the compensation sensor should not exceed the ratio of the amount of touch to the amount of error detected by the corresponding sense region. In this way, error in the sense signal can be reduced or eliminated without eliminating the touch information of the sense signal.

Figure 20:
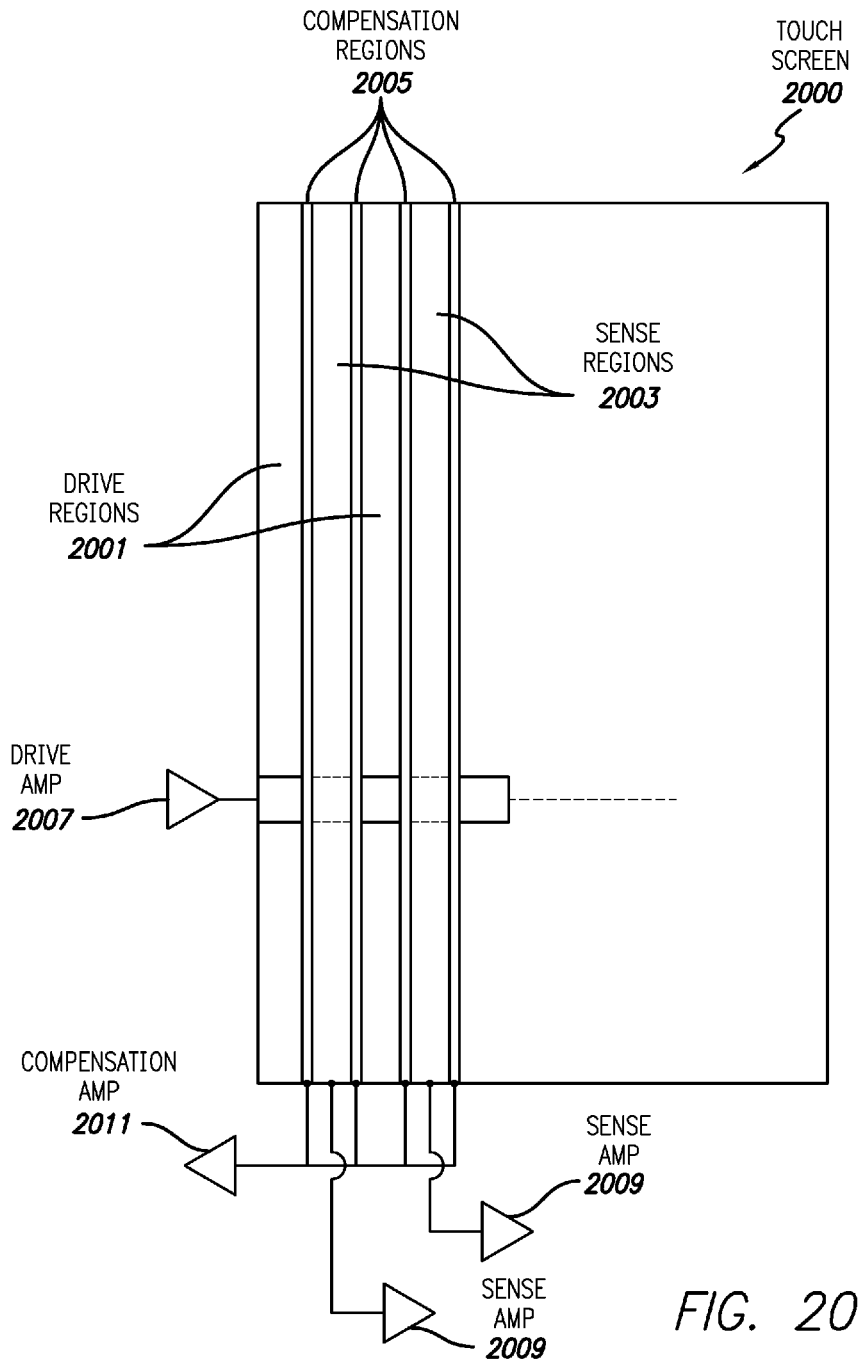
FIG. 20 illustrates an example touch screen configuration according to embodiments of the disclosure.

FIG. 20 illustrates an example touch screen 2000 according to embodiments of the disclosure showing a more general view of an example configuration of drive regions 2001, sense regions 2003, compensation regions 2005, drive amplifiers 2007, sense amplifiers 2009, and compensation amplifiers 2011.

Figure 21:
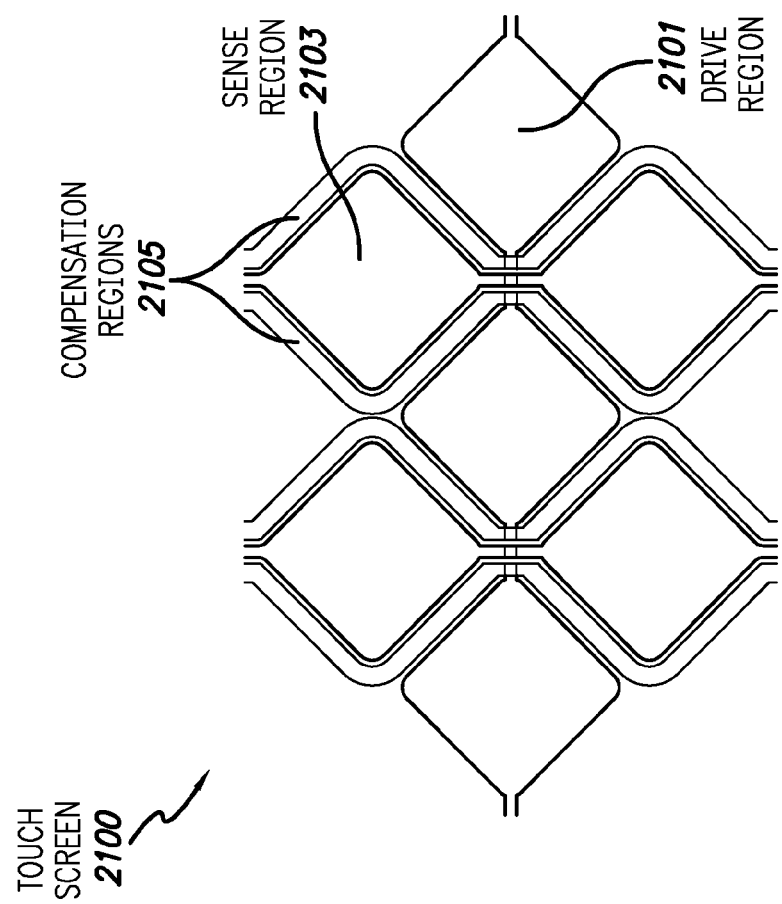
FIG. 21 illustrates another example touch screen configuration according to embodiments of the disclosure.

FIG. 21 illustrates a portion of an example touch screen 2100 including an example diamond configuration of regions, including drive regions 2101, sense regions 2103, and compensation regions 2105.

Figure 22:
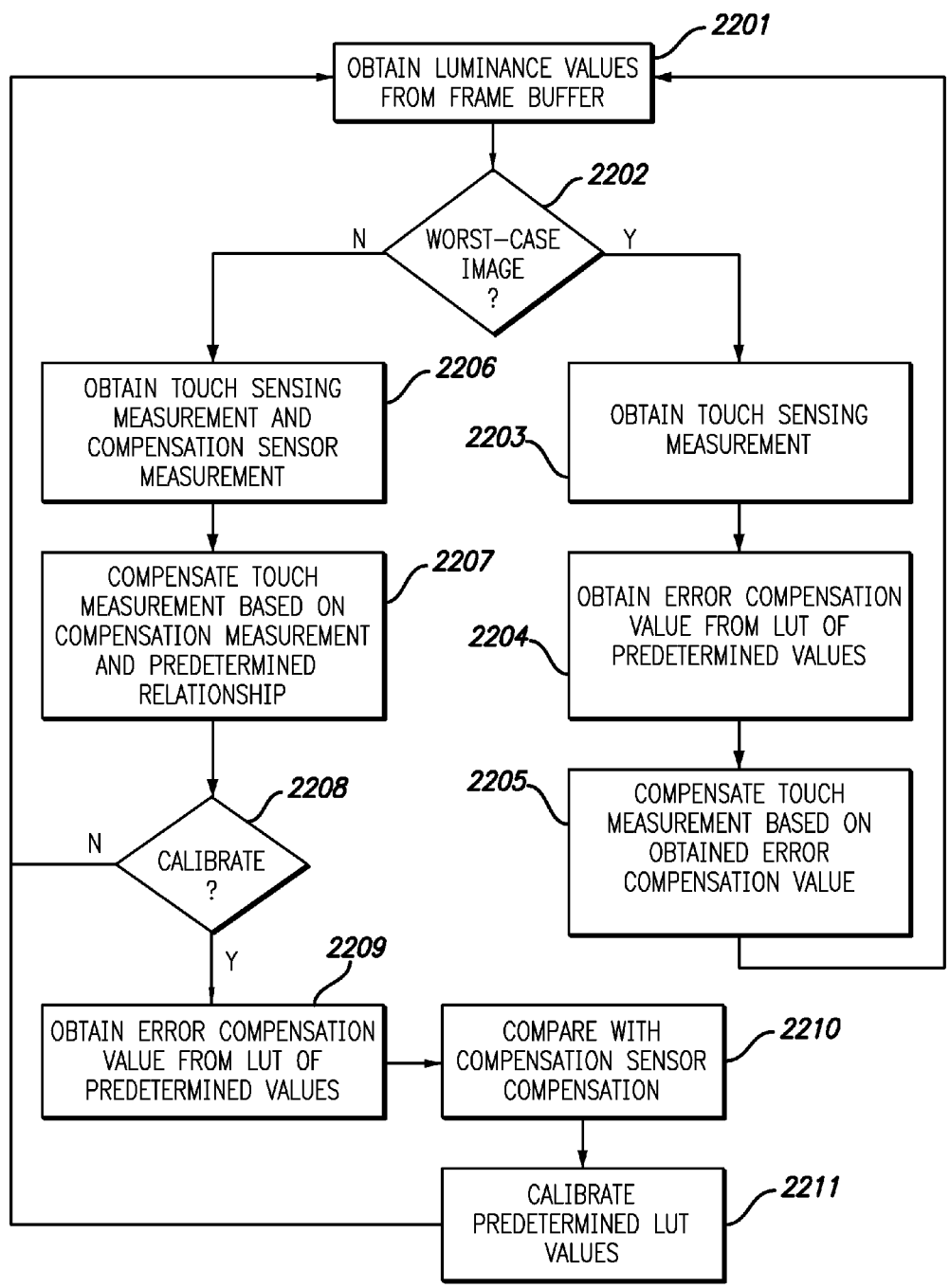
FIG. 22 illustrates a flowchart of an example method of compensating for error in touch measurement using a combination of predetermined error compensation values and compensation sensors according to embodiments of the disclosure.

FIG. 22 illustrates a flowchart of an example combination method of compensating for error in sense signal measurements that includes measuring compensation signals of compensation sensors, and using predetermined error compensation values stored in a LUT. In this example method, average luminance of display pixels can be a source of error, for example, as in the example embodiments described above. A combination method may be beneficial in some embodiments, for example, if a compensation sensor approach does not work well in certain situations. In the example embodiment of touch screen 1200, for example, an image may be displayed in which high luminance values (such as the color white) can be displayed by all of the display pixels in the compensation region of a compensation sensor, while low luminance values (such as the color black) can be displayed by all of the display pixels in a corresponding sense region. In this case, error introduced into the sense region through an error mechanism such as error mechanism 1400 of FIG. 14 can be substantially different than an error introduced into the compensation region through a corresponding error mechanism such as error mechanism 1450. In particular, if all of the pixels in the compensation have high luminance values, the liquid crystal capacitance portion of the drive-comp error mechanism can be different than the drive-sense error mechanism, in which all of the pixel luminances are low. Therefore, for some "worst-case" images, the compensation signal measurement may incorrectly compensation for error. In some embodiments, utilizing predetermined error compensation values that have been measured for the worst-case images can provide more accurate error compensation.

Referring to FIG. 22, a touch screen in a touch phase of operation can obtain (2200) luminance values from a frame buffer of the display system that stores luminance values of display pixels for use in a next display scan during a display phase and can determine (2202) if the luminance values represent a worst-case image or portion of an image relevant to individual touch pixels, for example. If a worst-case image is determined, a touch sensing measurement can be obtained (2203) and a predetermined error compensation value can be obtained (2204) from a LUT of predetermined values. The touch measurements can be compensated (2205) based on the predetermined error values.

If the image is determined not to be a worst-case image at 2202, touch sensing and compensation sensor measurements can be obtained (2206). The touch measurement can be compensated (2207) based on the compensation measurement and a predetermined relationship. A determination (2208) can be made whether or not a calibration should be performed. If it is determined not to perform calibration, the process can return to 2201. If a calibration is to be performed, a predetermined error compensation value for the current image can be obtained (2209) from the LUT of predetermined values, and the predetermined values can be compared (2210) with the compensation measurement values. If there is a large difference between the two values, the predetermined values can be calibrated (2211) based on the difference.

Although embodiments of this disclosure have been fully described with reference to the accompanying drawings, it is to be noted that various changes and modifications including, but not limited to, combining features of different embodiments, omitting a feature or features, etc., as will be apparent to those skilled in the art in light of the present description and figures.

For example, one or more of the functions of computing system 200 described above can be performed by firmware stored in memory (e.g. one of the peripherals 204 in FIG. 2) and executed by touch processor 202, or stored in program storage 232 and executed by host processor 228. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Example embodiments may be described herein with reference to a Cartesian coordinate system in which the x-direction and the y-direction can be equated to the horizontal direction and the vertical direction, respectively. However, one skilled in the art will understand that reference to a particular coordinate system is simply for the purpose of clarity, and does not limit the direction of the elements to a particular direction or a particular coordinate system. Furthermore, although specific materials and types of materials may be included in the descriptions of example embodiments, one skilled in the art will understand that other materials that achieve the same function can be used. For example, it should be understood that a "metal layer" as described in the examples below can be a layer of any electrically conductive material.

In some embodiments, the drive lines and/or sense lines can be formed of other elements including, for example other elements already existing in typical LCD displays (e.g., other electrodes, conductive and/or semiconductive layers, metal lines that would also function as circuit elements in a typical LCD display, for example, carry signals, store voltages, etc.), other elements formed in an LCD stackup that are not typical LCD stackup elements (e.g., other metal lines, plates, whose function would be substantially for the touch sensing system of the touch screen), and elements formed outside of the LCD stackup (e.g., such as external substantially transparent conductive plates, wires, and other elements). For example, part of the touch sensing system can include elements similar to known touch panel overlays.

In this example embodiment, each sub-pixels can be a red (R), green (G) or blue (B) sub-pixel, with the combination of all three R, G and B sub-pixels forming one color display pixel. Although this example embodiment includes red, green, and blue sub-pixels, a sub-pixel may be based on other colors of light or other wavelengths of electromagnetic radiation (e.g., infrared) or may be based on a monochromatic configuration.

What is claimed is:

1. A touch screen comprising:
    a drive region configured to be driven by a drive signal;
    a sense region disposed adjacent to the drive region, the sense region configured to output a sense signal that includes information of a first amount of touch on or near the touch screen and information of a first amount of error, wherein the first amount of touch is based on the drive signal;
    a compensation sensor disposed between the drive region and the sense region, the compensation sensor configured to output a compensation signal that includes information of a second amount of error, wherein the second amount of error is based on the drive signal; and
    an error compensator configured to compensate for the first amount of error in the sense signal based on the second amount of error in the compensation signal,
    wherein at least a portion of each of the first and second amounts of error is introduced into the compensation signal and the sense signal, respectively, by a same error source.

2. The touch screen of claim 1, wherein the compensation signal further includes information of a second amount of touch based on the drive signal, a ratio of the second amount of touch to the second amount of error not exceeding a ratio of the first amount of touch to the first amount of error.

3. The touch screen of claim 2, wherein the drive region includes a first conductive line in a first direction, the sense region includes a second conductive line in a second direction transverse to the first direction, the compensation sensor includes a third conductive line, the information of the first amount of touch is based on a change in a capacitance between first and second conductive lines, and the information of the second amount of touch is based on a change in a capacitance between the first and third conductive lines.

4. The touch screen of claim 1, wherein the error source includes one of an average display pixel luminance, a local temperature, and an amount of ambient light.

5. The touch screen of claim 1, wherein the drive region includes a first conductive line in a first direction, the sense region includes a second conductive line in a second direction transverse to the first direction, and the information of the first amount of touch is based on a change in a capacitance between first and second conductive lines.

6. The touch screen of claim 1, further comprising:
    a plurality of sense regions; and
    a plurality of compensation sensors,
    wherein each compensation sensor is disposed between two sense regions.

7. The touch screen of claim 1, wherein the information of the second amount of error is based on the drive signal.

8. The touch screen of claim 7, further comprising:
    a circuit capacitively coupled to the drive region, such that a first portion of the drive signal is coupled into the circuit,
    wherein the circuit is further capacitively coupled to each of the sense region and the compensation sensor, such that the information of the first amount of error is based on a second portion of the first portion of the drive signal coupled into the sense region from the circuit, and the information of the second amount of error is based on a third portion of the first portion of the drive signal coupled into the compensation sensor from the circuit.

9. The touch screen of claim 8, wherein the circuit includes a portion of a display system that displays images on the touch screen.

10. The touch screen of claim 9, wherein the circuit includes a gate line of the display system.

11. A method of compensating for error in a touch sensing signal, the method comprising:
    obtaining the touch sensing signal from a sense region disposed adjacent to a drive region, the touch sensing signal including information of a first amount of touch and information of a first amount of error, wherein the first amount of touch is based on a drive signal driving the drive region;
    obtaining a compensation signal from a compensation sensor disposed between the drive region and the sense region, the compensation signal including information of a second amount of error, wherein the second amount of error is based on the drive signal; and
    compensating for the first amount of error in the touch sensing signal based on the second amount of error in the compensation signal,
    wherein at least a portion of each of the first and second amounts of error is introduced into the compensation signal and the sense signal, respectively, by a same error source.

12. The method of claim 11, wherein the compensation signal further includes second information of an amount of touch, and a ratio of the second amount of touch to the second amount of error does not exceed a ratio of the first amount of touch to the first amount of error.

13. The method of claim 11, wherein obtaining the touch sensing signal includes driving drive regions of a touch screen with drive signals and obtaining the touch sensing signal from one or more sense regions of the touch screen, the method further comprising:
    obtaining information of a state of a display system that displays an image on the touch screen;
    determining if the state information satisfies a first criteria; and
    in accordance with a determination that the state information satisfies the first criteria, determining the second amount of error based on a predetermined value of error independent of the information of the second amount of error of the compensation signal, wherein compensating for the first amount of error is based on the predetermined value of error.

14. The method of claim 13, wherein the state information includes one of an average display pixel luminance, a local temperature, and an amount of ambient light.

15. The method of claim 13, further comprising:
    in accordance with a determination that the state information does not satisfy the first criteria, calibrating the predetermined value of error based on the information of the second amount of error obtained from the compensation signal.

16. The method of claim 14, wherein the state information includes a plurality average display pixel luminances, and the first criteria is based on a difference in average display pixel luminances of two regions of display pixels of the touch screen.

* * * * *